United States Patent
Kuhn et al.

(10) Patent No.: US 11,691,882 B2
(45) Date of Patent: Jul. 4, 2023

(54) SUPPORTED PEROVSKITE-OXIDE COMPOSITES FOR ENHANCED LOW TEMPERATURE THERMOCHEMICAL CONVERSION OF $CO_2$ TO CO

(71) Applicant: University of South Florida, Tampa, FL (US)

(72) Inventors: John Kuhn, Tampa, FL (US); Bryan Hare, Orlando, FL (US); Debtanu Maiti, Tampa, FL (US); Yolanda Daza, Beaverton, OR (US); Venkat Bhethanabotla, Tampa, FL (US)

(73) Assignee: University of South Florida, Tampa, FL (US)

( * ) Notice: Subject to any disclaimer, the term of this patent is extended or adjusted under 35 U.S.C. 154(b) by 160 days.

(21) Appl. No.: 16/616,063

(22) PCT Filed: May 30, 2018

(86) PCT No.: PCT/US2018/035186
§ 371 (c)(1),
(2) Date: Nov. 22, 2019

(87) PCT Pub. No.: WO2018/222749
PCT Pub. Date: Dec. 6, 2018

(65) Prior Publication Data
US 2020/0139351 A1 May 7, 2020

Related U.S. Application Data

(60) Provisional application No. 62/672,999, filed on May 17, 2018, provisional application No. 62/512,475, filed on May 30, 2017.

(51) Int. Cl.
*B01J 23/83* (2006.01)
*B01J 35/10* (2006.01)
(Continued)

(52) U.S. Cl.
CPC ............... *C01B 32/40* (2017.08); *B01J 21/00* (2013.01); *B01J 23/002* (2013.01); *B01J 23/10* (2013.01);
(Continued)

(58) Field of Classification Search
CPC .......... B01J 23/002; B01J 23/78; B01J 23/83
See application file for complete search history.

(56) References Cited

U.S. PATENT DOCUMENTS 4,055,513 A * 10/1977 Wheelock ............... C10G 49/02
502/340
5,443,807 A 8/1995 Tang et al.
(Continued)

FOREIGN PATENT DOCUMENTS

DE 19506659 C1 * 8/1996 ......... B01D 53/8662
JP 2010238546 A * 10/2010

OTHER PUBLICATIONS

Machine translation of JP20100238546A, publication date Oct. 2010.*
(Continued)

*Primary Examiner* — Jun Li
(74) *Attorney, Agent, or Firm* — Quarles & Brady LLP

(57) ABSTRACT

Disclosed herein is a catalyst composite containing a perovskite-oxide and an oxide support, methods of preparing a catalyst composite containing a perovskite-oxide and an oxide support, and the use thereof for $CO_2$ conversion by a reverse water gas shift chemical looping (RWGS-CL) process.

19 Claims, 23 Drawing Sheets

(51) Int. Cl.
    B01J 37/02     (2006.01)
    B01J 37/08     (2006.01)
    C01B 32/40     (2017.01)
    B01J 23/00     (2006.01)
    B01J 35/00     (2006.01)
    B01J 23/10     (2006.01)
    B01J 23/16     (2006.01)
    B01J 23/26     (2006.01)
    B01J 23/34     (2006.01)
    B01J 37/00     (2006.01)
    B01J 37/03     (2006.01)
    B01J 21/00     (2006.01)
    B01J 23/78     (2006.01)

(52) U.S. Cl.
    CPC .............. B01J 23/16 (2013.01); B01J 23/26
            (2013.01); B01J 23/34 (2013.01); B01J 23/78
                (2013.01); B01J 23/83 (2013.01); B01J
                    35/002 (2013.01); B01J 35/006 (2013.01);
                        B01J 35/0013 (2013.01); B01J 35/1009
                        (2013.01); B01J 35/1014 (2013.01); B01J
                    35/1019 (2013.01); B01J 35/1023 (2013.01);
                        B01J 37/0036 (2013.01); B01J 37/0215
                        (2013.01); B01J 37/036 (2013.01); B01J
                                            37/08 (2013.01)

(56) References Cited

U.S. PATENT DOCUMENTS

| | | |
|---|---|---|
| 9,815,702 B1 | 11/2017 | Kuhn et al. |
| 2005/0164890 A1 | 7/2005 | Zeng et al. |
| 2015/0129805 A1 | 5/2015 | Karpenko et al. |
| 2015/0182954 A1 | 7/2015 | Nazarpoor et al. |

OTHER PUBLICATIONS

Machine translation of DE19506659C1, publication date Aug. 8, 1996.*
Labhasetwar et al., Perovskite-type catalytic materials for environmental applications, 2015 Sci. Technol. Adv. Mater. 16, 036002.*
Abe. T. et al., "CO2 Methanation Property of Ru Nanopartide-Loaded TiO2 Prepared by a Polygonal Barrel-Sputtering Method," 2009, Energy and environmental Science, 2:315-321.
Biesinger, M.C. et al., "Resolving Surface Chemical States in XPS Analysis of First Row Transition Metals. Oxides and Hydroxides: Cr, Mn, Fe, Co and Ni," 2011, Applied Surface Science, 257:2717-2730.
Bork, A.H. et al., "Perovskite La0.6Sr0.4Cr1-xCoxO3-(delta) Solid Solutions for Solar-Thermochemical Fuel Production: Strategies to Lower the Operation Temperature," 2015, Journal of Materials Chemistry A, 3:15546-15557.
Calle-Vallejo, F. et al., "Physical and Chemical Nature of the Scaling Relations between Adsorption Energies of Atoms on Metal Surfaces," 2012, Physical Review Letters, 108:116103.
Carbon Recycling International, Website, <https://www.carbonrecycling.is/>, accessed Aug. 13, 2019, 26pp.
Centi, G. et al., "Catalysis for CO2 Conversion: A Key Technology for Rapid Introduction of Renewable energy in the Value Chain of Chemical Industries," 2013, Energy and Environmental Science, 6:1711-1731.
Centi, G. et al., "Opportunities and Prospects in the Chemical Recycling of Carbon Dioxide to Fuels," 2009, Catalysis Today, 148:191-205.
Chen, C.-F. et al., "Oxygen-deficient BaTiO3-x Perovskite as an Efficient Bifunctional Oxygen Electrocatalyst," 2015, Nano Energy, 13:423-432.
Cheng, D. et al., "Computational Approaches to the Chemical Conversion of Carbon Dioxide," 2013, ChemSusChem, 6:944-965.

Chueh, W.C. et al., "High-Flux Solar-Driven Thermochemical Dissociation of CO2 and H2O Using Nonstoichiometric Ceria," 2010, Science, 330:1797-1801.
Curnan, M.T. et al., "Effects of Concentration, Crystal Structure, Magnetism, and Electronic Structure Method on First-Principles Oxygen Vacancy Formation Energy Trends in Perovskites," 2014, Journal of Physical Chemistry C, 118:28776-28790.
Daza, Y.A. et al., "Carbon Dioxide Conversion by Reverse Water-Gas Shift Chemical Looping on Perovskite-Type Oxides," 2014, Industrial and Engineering Chemistry Research, 53:5828-5837.
Daza, Y.A. et al., "Isothermal Reverse Water Gas Shift Chemical Looping on LaO. 75SrO. 24Co (1-Y) FeYO3 Perovskite-Type Oxides," 2015, Catalysis Today, 258:691-698.
Daza, Y.A. et al., "More Cu, More Problems: Decreased CO2 Conversion Ability by Cu-Doped La0.75Sr0.25FeO3 Perovskite Oxides," 2016, Surface Science, 648:92-99.
Demi, A.M. et al., "Oxide Enthalpy of Formation and Band Gap Energy as Accurate Descriptors of Oxygen Vacancy Formation Energetics," 2014, Energy and environmental Science, 7:1996-2004.
Deml, AM. et al., "Intrinsic Material Properties Dictating oxygen Vacancy Formation Energetics in Metal Oxides," 2015, The Journal of Physical Chemistry Letters, 6:1948-1953.
Deml, A.M. et al., "Tunable Oxygen Vacancy Formation Energetics in the Complex Perovskite Oxide SrxLa1-xMnyAl1-yO3," 2014, Chemistry of Materials, 26:6595-6602.
Dharanipragada, N.V.R.A. et al., "Mg—Fe—Al—O for advanced Co2 to Co conversion: carbon monoxide yield vs. oxygen storage capacity," 2015, Journal of Mater. Chem. A, 3: 16251-16262.
Druce, J. et al., "Surface Termination and Subsurface Restructuring of Perovskite-Based Solid Oxide Electrode Materials," 2014, Energy and Environmental Science, 7:3593-3599.
Fernandez, E.M. et al., "Scaling Relationships for Adsorption Energies on Transition Metal Oxide, Sulfide, and Nitride Surfaces," 2008, Angewandte Chemie Internaional Edition, 47:4683-4686.
Furler, P. et al., "Solar Thermochemical CO2 Splitting Utilizing a Reticulated Porous Ceria Redox System," 2012, Energy and Fuels, 26:7051-7059.
Furler, P. et al., "Syngas Production by Simultaneous Splitting of H2O and CO2 via Ceria Redox Reactions in a High-Temperature Solar Reactor," 2012, Energy and Environmental Science, 5:6098-6103.
Galvita, V.V. et al., "CeO2-Modified Fe2O3 for CO2 Utilization via Chemical Looping," 2013, Industrial and Engineering Chemistry Research, 52:8416-8426.
Gibbons, J. et al., "Carbon Capture and Storage," 2008, Energy Policy, 36:4317-4322.
Gines, M.J. L. et al., "Kinetic Study of the Reverse Water-Gas Shift Reaction over CuO/ZnO/Al2O3 Catalysts," 1997, Applied Catalysis A: General, 154:155-171.
Global Carbon Capture and Storage Institute, "The Global Status of CCS: 2016 Summary Report," 2016 <https://www.globalccsinstitute.com/wp-content/uploads/2018/12/Global-Status-Report-2016_Summary.pdf> accessed Aug. 13, 2019, 28pp.
Graves, C. et al., "Sustainable Hydrocarbon Fuels by Recycling CO2 and H2O with Renewable or Nuclear energy," 2011, Renewable and Sustainable Energy Reviews, 51 :1-23.
Hohenberg, P. et al., "Inhomogeneous Electron Gas," 1964, Physical Review, 136:B864-B871.
Huang, Y., et al., "Enhanced Photoreduction Activity of Carbon Dioxide over Co3O4/CeO2 Catalysts under Visible Light Irradiation," 2015, International Journal of Photoenergy, 2015: 11 pp.
Inoue, T. et al., "Hydrogenation of Carbon Dioxide and Carbon Monoxide over Supported Rhodium Catalysts under 10 Bar Pressure," 1989, Applied Catalysis, 46:1-9.
International Energy Agency, "Carbon Capture and Storage: The Solution for Deep Emissions Reductions," 2015, 12pp.
Izumi, Y., "Recent Advances in the Photocatalytic Conversion of Carbon Dioxide to Fuels with Water and/or Hydrogen Using Solar Energy and Beyond," 2013, Coordination Chemistry Reviews, 257:171-186.

(56) References Cited

OTHER PUBLICATIONS

Jos, G.J.M. et al., "Trends in Global CO2 Emissions," 2015 <https://edgar.jrc.ec.europa.eu/news_docs/jro-2015-trends-in-global-co2-emissions-2015-report-98184.pdf> accessed Aug. 13, 2019, 80pp.
Kaiser, P. et al., "Production of Liquid Hydrocarbons with CO2 as Carbon Source Based on Reverse Water-Gas Shift and Fischer-Tropsch Synthesis," 2013, Chemie Ingenieur Technik, 85:489-499.
Kohn, W. et al., "Sett-Consistent Equations Including Exchange and Correlation Effects," 1965, Pysical Review, 140: A 1133-A 1138.
Kolmakov, A. et al., "Chemical Sensing and Catalysis by One-Dimensional Metal-Oxide Nanostructures," 2004, Annual Review of Materials Research, 34:151-180.
Kondratenko, E.V., et al., "Status and Perspectives of CO2 Conversion into Fuels and Chemicals by Catalytic, Photocatalytic and Electrocatalytic Processes," 2013, Energy and Environmental Science, 6:3112-3135.
Krcha, M.D. et al., "Periodic Trends of Oxygen Vacancy Formation and C-H Bond Activation over Transition Metal-Doped CeO2 (1 1 1) Surfaces," 2012, Journal of Catalysis, 293:103-115.
Kresse, G. et al., "Ab initio Molecular Dynamics for Liquid Metals," 1993, Physical Review B, 47:558-561.
Kresse, G. et al., "Efficiency of ab-initio Total Energy Calculations for Metals and Semiconductors using a Plane Wave Basis Set," 1996, Computational Materials Science, 6:15-50.
Kresse, G. et al., "Efficient Iterative Schemes for ab initio Total-Energy Calculations using a Plane-Wave Basis Set," 1996, Physical Review B, 54:11169-11186.
Kresse, G. et al., "From ultrasoft pseudopotentials to the projector augmented-wave method," 1999. Physical Review B, 59:1758-1775.
Kuhn, J.N. et al., "Surface Properties of Sr- and Co-doped Lai=eO3," 2008, Journal of Catalysis, 253:200-211.
Lebouvier, A. et al., Assessment of Carbon Dioxide Dissociation as a New Route for Syngas Production: A Comparative Review and Potential of Plasma-Based Technologies,: 2013, Energy and Fuels, 27:2712-2722.
Li, K. et al., "A Critical Review of CO2 Photoconversion: Catalysts and Reactors," 2014, Catalysis Today, 224:3-12.
Lorentzou, S. et al., "Thermochemical CO2 and CO2/H2O Splitting over NiFe2O4 for Solar Fuels Synthesis," 2014, Energy Procedia, 49:1999-2008.
Ma, X. et al., "Engineering Complex, Layered Metal Oxides: High-Performance Nickelate Oxide nanostructures for Oxygen Exchange and Reduction," 2015, ACS Catalysis, 5:4013-4019.
Maiti, D. et al., "Oxygen Vacancy Formation Characteristics in the Bulk and Across Different surface Terminations of La(1-x)SrxFe(1-y)CoyO(3-(delta)) Perovskite Oxides for CO2 Conversion," 2016, Journal of Materials Chemistry A, 4:5137-5148.
Mallapragada, D.S. et al., "Sun-to-Fuel Assesment of Routes for Fixing CO2 as Liquid Fuel," 2013, Industrial and Engineering Chemistry Research, 52:5136-5144.
Markewitz, P. et al., "Worldwide Innovations in the Development of Carbon Capture Technologies and the Utilization of CO2," 2012, Energy and Environmental Science, 5:7281-7305.
McDaniel, A.H. et al., "Sr- and Mn-Doped LaAlO3-(delta) for Solar Thermochemical H2 and CO Production,"2013, Energy and Environmental Science, 6:2024-2028.
Mefford, J.T. et al., "Water Electrolysis on La(1-x)Sr(x)CoO(3-(delta)) Perovskite Electrocatalysts," 2016, Nature Communications, 7: 11053.
Michalsky, R. et al., "Departures from the Adsorption Energy Scaling Relations for Metal Carbide Catalysts," 2014, The Journal of Physical chemistry C, 118:13026-13034.
Miller, J.E. et al., "Metal Oxide Composites and Structures for Ultra-High Temperature Solar Thermochemical Cycles," 2008, Journal of Materials Science, 43:4714-4728.
Monkhorst, H.J. et al., "Special Points for Brillouin-zone Integrations," 1976, Physical Review B, 13:5188-5192.
New CO2 Fuels, Website, <http://www.newco2fuels.co.il/>, accessed Aug. 13, 2019, 16pp.

Nohira, H. et al., "Characterization of ALCVD-Al2O3 and ZrO2 Layer using X-Ray Photoelectron Spectroscopy," 2002, Journal of Non-Crystalline Solids, 303:83-87.
Nomura, K. et al., "Oxidative Coupling of Methane on Perovskite Oxides, (Ba, Ca)(Co, Fe)O3-(delta)," 1993, "Applied Catalysis A: General," 101:63-72.
Pena, Ma et al., "Chemical Structures and Performance of Perovskite Oxides," 2001, Chemical Reviews, 101:1981-2017.
Perdew, J.P. et al., "Generalized Gradient Approximation Made Simple," 1996, Physical Review Letters, 77:3865-3868.
Popa, M. et al., "Synthesis of Lanthanum Cobaltite (LaCoO3) by the Polymerizable Complex Route," 2002, Solid State Ionics, 151:251-257.
Porosoff, M.D. et al., "Catalytic Reduction of CO2 by H2 for Synthesis of CO, Methanol and Hydrocarbons: Challenges and Opportunities," 2016, Energy and Environmental Science, 9:62-73.
Redfern, Sat., "High-Temperature Structural Phase Transitions in Perovskite (CaTiO3)," 1996, Journal of Physics: Condensed Matter, 8:8267-8275.
Riedel, T. et al., "Kinetics of CO2 Hydrogenation on a K-Promoted Fe Catalyst," 2001, Industrial and Engineering Chemistry Research, 40: 1355-1363.
Rihko-Struckmann, L.K. et al., "Hydrogen and Carbon Monoxide Production by Chemical Looping over Iron-Aluminium Oxides," 2016, Energy Technology, 4:304-313.
Scheffe, J.R. et al., "Lanthanum-Strontium-Manganese Perovskites as Redox Materials for Solar Thermochemical Splitting of H2O and CO2," 2013, Energy and Fuels, 27:4250-4257.
Solar-Jet, Website, <http://www.solar-jet.aero/>, accessed Aug. 13, 2019, 9pp.
Suntivich, J. et al., "A Perovskite Oxide Optimized for Oxygen Evolution Catalysis from Molecular Orbital Principles," 2011, Science, 334:1383.
Suntivich, J. et al., "Design Principles for Oxygen-Reduction Activity on Perovskite Oxide Catalysts for Fuel Cells and Metal-Air Batteries," 2011, Nature Chemistry, 3:546-550.
Svarcova, S. et al., "Structural Instability of Cubic Perovskite BaxSr1-xCo1-yFeyO3-d," 2008. Solid State Ionics, 178:1787-1791.
Tan, H. et al., "Oxygen Vacancy enhanced Photocatalytic Activity of Pervoskite SrTiO3," 2014, ACS Applied Materials and Interfaces, 6:19184-19190.
Thermo-Scientific, "Advantage Data System for XPS," <httpJ/xpssimplified.com/periodictable.php> accessed Aug. 13, 2019.
Torregrosa-Rivero, V. et al., "Coper Doped BaMnO3 Perovskite Catalysts for NO Oxidation and NO2-Assisted Diesel Soo Removal," 2017, RSC Advances, 7:35228-35238.
Uhlig, I. et al., "Surface States and Reactivity of Pyrite and Marcasite," 2001, Applied Surface Science, 179:222-229.
Wang, L. et al., "Oxidation Energies of Transition Metal Oxides within the GGA+U Framework," 2006, Physical Review B, 73:195107.
Wang, W. et al., "Recent Advances in Catalytic Hydrogenation of Carbon Dioxide," 2011, Chemical Society Reviews, 40:3703-3727.
Wenzel, M. et al., "CO Production from CO2 via Reverse Water-Gas Shift Reaction Performed in a Chemical Looping Mode: Kinetics on Modified Iron Oxide," 2017, Journal of CO2 Utilization, 17:60-68.
Wenzel, M. et al., "thermodynamic Analysis and Optimization of RWGS Processes for Solar Syngas Production from CO2," 2016, AIChE Journal, 63:15-22.
Wu, H.-C., "Effects of Oxygen Vacancy Order-Disorder Phase Transition on Air Separation by Perovskite Sorbents," 2017, Industrial and Engineering Chemistry Research, 56:6057-6064.
Zhu, K. et al., "Perovskites Decorated with oxygen Vacancies and Fe-Ni Alloy Nanoparticles as High-Efficiency Electrocatalysts for the Oxygen Evolution Reaction," 2017, Journal of Materials Chemistry A, 5:19836-19845.
Daza, Y.A., "Closing a Synthetic Carbon Cycle: Carbon Dioxide Conversion to Carbon Monoxide for Liquid Fuels Synthesis," 2016, University of South Florida Graduate Thesis (135pp).

\* cited by examiner

SUPPORTED PEROVSKITE-OXIDE COMPOSITES FOR ENHANCED LOW TEMPERATURE THERMOCHEMICAL CONVERSION OF $CO_2$ TO CO

CROSS-REFERENCE TO RELATED APPLICATION(S)

This application claims the benefit of and priority to U.S. Provisional Patent Application No. 62/512,475, filed on May 30, 2017 and U.S. Provisional Patent Application No. 62/672,999, filed on May 17, 2018, the contents of which are incorporated by reference herein in their entirety, and priority to which is hereby claimed.

STATEMENT REGARDING FEDERALLY SPONSORED RESEARCH OR DEVELOPMENT

This invention was made with government support under CBET1335817, IIP1743623, CHE1531590 and EEC1560303 awarded by the National Science Foundation. The government has certain rights in the invention.

TECHNICAL FIELD

The invention relates to a catalyst composite containing a perovskite-oxide and an oxide support, and the use thereof for $CO_2$ conversion by reverse water gas shift chemical looping (RWGS-CL) process.

BACKGROUND

Throughout preceding decades, global environmental concerns instigated a major shift of research focus and investment in renewable energy generation. However, the need for fossil fuels remains on the rise due to demand for transportation fuels and electricity, resulting in vast emissions of carbon dioxide, a major greenhouse gas. Efficient conversion of $CO_2$ to valuable hydrocarbons is crucial for energy security and a balanced carbon cycle.

Carbon capture and storage (CCS) is aimed at mitigating this $CO_2$ emission problem and promote carbon neutrality. However, annual emissions (~35 GT in 2015) continue to relentlessly outweigh the scale of reutilization (estimated ~35 MT in early 2017). This scenario demands several processes that are capable of converting $CO_2$ to CO to valuable hydrocarbons. The extreme conditions required for natural $CO_2$ dissociation, over 2000° C. in vacuum, underscore the need for catalytic reinforcements and more energy-efficient processes. Amongst the proposed techniques, solar thermochemical approach (STC), for instance, is particularly attractive. It presents the novelty of harvesting solar energy towards repurposing waste $CO_2$ emissions to hydrocarbons. Corresponding CO selectivity and $CO_2$ conversion rates are much higher than those of photocatalytic methodologies which struggle to achieve even 1 µmol $g_{cat}^{-1}$ $min^{-1}$. However, STC processes are typically accompanied by extreme operation temperatures (≥1000° C.), thereby limiting implementation due to a narrow range of stable materials.

A feasible alternative is reverse water gas shift chemical looping (RWGS-CL). RWGS-CL uses mixed metal oxides to convert $CO_2$ to CO at much lower temperatures (450-700° C.). However, development of an oxide material that is capable of balancing formation of numerous oxygen vacancies, kinetics for $CO_2$ activation and oxygen exchange, and lasting through numerous reaction cycles required for an industrial catalyst has been challenging. Therefore, there remains an unmet need for catalytic materials with structural stability and long-term activity of $CO_2$ conversion for industrial scale RWGS-CL processes.

SUMMARY

In an aspect, the disclosure relates to a catalyst composite comprising a perovskite-oxide of formula $ABO_3$, wherein A is an alkaline earth element, a rare-earth element, an alkali metal element, a metal element, or a combination thereof, and B is a transitional metal element, metal element, or a combination thereof; and an oxide support having a formula different from the perovskite-oxide.

In another aspect, the disclosure relates to a method for forming a catalyst composite comprising mixing a perovskite-oxide of formula $ABO_3$ with an oxide support having a formula different from the perovskite-oxide to form a mixture, wherein A is an alkaline earth element, a rare-earth element, an alkali metal element, a metal element, or a combination thereof, B is a transitional metal element, a metal element, or a combination thereof; and heating the mixture to a temperature of between 600° C. and 1300° C. In some embodiments, the perovskite-oxide used in the present preparation method has a cubic crystal structure, the O atoms being at the edge centers. In some embodiments of the disclosed preparation method, the perovskite-oxide adheres to the oxide support, and the oxide support induces strain in the crystal structure, causes surface reconstruction/termination, and/or regulates crystallite growth of active surfaces of the perovskite-oxide.

The disclosed perovskite-oxide may have a formula of $ABO_3$. In some embodiments, A is selected from the group consisting of Pb, Ca, Mg, Be, Sr, Ba, La, K, and Na or a combination thereof. In some embodiments, A has a formula of $A^1_x A^2_y$, wherein $A^1$ and $A^2$ are independently Pb, Ca, Mg, Be, Sr, Ba, La, K, or Na, x is 0-1, y is 0-1, and the sum of x and y is 1. In some embodiments, A has a formula of $A^1_x A^2_y$ and is $La_{0.75}Sr_{0.25}$. In some embodiments, B is selected from the group consisting of Fe, Ti, Y, Mn, Al, Cr, Co, Ta, Ni, and Ce, or a combination thereof. In some embodiments, the perovskite-oxide is $La_{0.75}Sr_{0.25}FeO_3$.

In some embodiments, the oxide support is $CeO_2$, $ZrO_2$, $Al_2O_3$, $SiO_2$, $TiO_2$, or a combination thereof. In some embodiments, a weight ratio of the perovskite-oxide to the oxide support is from 10:90 to 90:10.

In a further aspect, the disclosure relates to a method for converting $CO_2$ to CO comprising contacting $H_2$ with the catalyst composite comprising a perovskite-oxide and an oxide support, whereby the perovskite-oxide is reduced, and whereby $H_2$ is oxidized to produce $H_2O$ and contacting $CO_2$ with the catalyst composite, whereby the reduced perovskite-oxide is oxidized, and whereby $CO_2$ is reduced to produce CO.

In some embodiments, the temperature of the method for converting $CO_2$ to CO is isothermal between 450° C. and 800° C. In some embodiments, the perovskite-oxide reduction is at a different temperature than the perovskite-oxide oxidation. In some embodiments the perovskite-oxide reduction is between 400° C. and 850° C. In some embodiments, the perovskite-oxide oxidation is between 450° C. and 900° C.

In some embodiments, CO is produced by the disclosed method at a rate greater than a process using the perovskite-oxide without the oxide support. In some embodiments, CO is produced at a rate of 0.5 to 1 mmol CO/g perovskite-oxide/min.

In some embodiments, the disclosed method includes repeating the perovskite reduction and the perovskite oxidation in succession.

The disclosure provides for other aspects and embodiments that will be apparent in light of the following detailed description and accompanying figures.

BRIEF DESCRIPTION OF THE DRAWINGS

The features, objects and advantages other than those set forth above will become more readily apparent when consideration is given to the detailed description below. Such detailed description makes reference to the following drawings.

Figure 1:
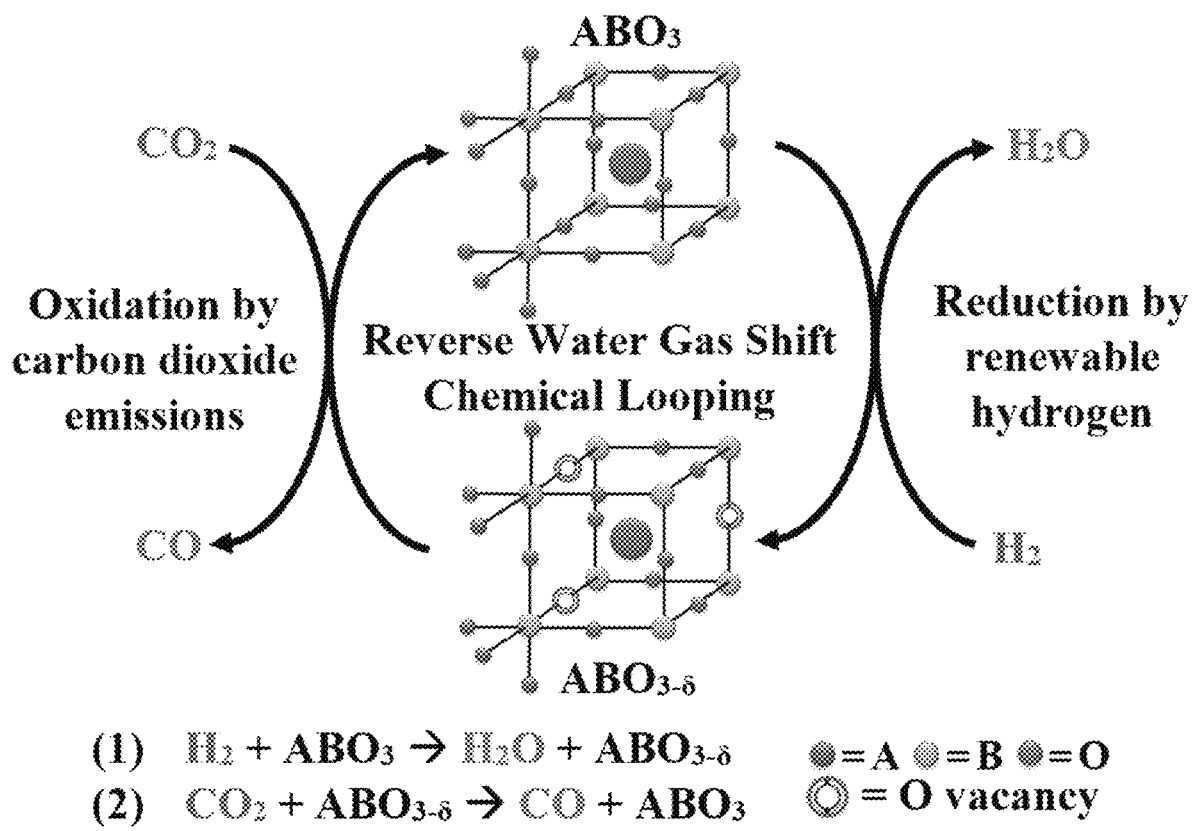
FIG. 1 shows the reverse water gas shift-chemical looping (RWGS-CL) process.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

The patent or application file contains at least one drawing executed in color. Copies of this patent or patent application publication with color drawing(s) will be provided by the Office upon request and payment of the necessary fee.

DETAILED DESCRIPTION

The present disclosure relates to a catalyst composite containing a perovskite-oxide and an oxide support, and the use of such catalyst composite for converting carbon dioxide ($CO_2$) to carbon monoxide (CO) in an industrial scale process. Various aspects of suitable perovskite-oxides and their uses as catalysts for the thermochemical conversion of $CO_2$ to CO are described in U.S. patent application Ser. No. 15/903,196 to Kuhn et al. ("PEROVSKITE-OXIDES FOR THERMOCHEMICAL CONVERSION OF CARBON DIOXIDE," filed Feb. 23, 2018), which is herein incorporated by reference in its entirety.

In some aspects, the perovskite-oxide and the oxide support forms the disclosed composite catalyst inducing strain in the crystal structure of the perovskite-oxide and increasing the exposed surface area.

Surprisingly, the advantages of utilizing the composite catalyst in the disclosed method include the high rates of conversion of $CO_2$ to CO and increased long-term stability for repeated catalytic oxidation-reduction cycles, allowing this technique to be useful, for example, for providing a stable catalyst platform for industrial low temperature $CO_2$ thermochemical conversion. The increased stability of the composite catalyst allows repetitive cycles of the disclosed method, thereby generating large quantities of CO, which can be subsequently converted to hydrocarbons via Fischer-Tropsch synthesis.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

An "active surface" is those surface terminations, or elements at the crystal surface facets, in the perovskite oxide that participate in the redox reactions during the RWGS-CL process.

An "alkali metal element" is a group of elements consisting of lithium (Li), sodium (Na), potassium (K), rubidium (Rb), cesium (Cs), and francium (Fr).

An "alkaline earth element" is one of the six chemical elements in group 2 of the periodic table including beryllium (Be), magnesium (Mg), calcium (Ca), strontium (Sr), barium (Ba), and radium (Ra).

"Catalyst" as used herein refers to a substance that increases the rate of a chemical reaction without itself undergoing any permanent chemical change.

"Composite" as used herein refers to a material made from two or more constituent materials that, when combined, produce a material with different physical and/or chemical characteristics different from the individual starting materials.

The term "crystallite size" as used herein refers to the measurement that encompasses all the lattices in a repetitive structure, or repeating unit cells, until a defect occurs or the repetitive structure ends at the boundary of the crystal. In some embodiments, the crystallite size of the crystalline structures as disclosed herein is between 5 nm to 100 nm, such as between 10 nm and 90 nm, between 20 nm and 80 nm, between 30 nm and 70 nm, or between 40 nm and 60 nm.

A "metal element" includes any of the alkali metals, alkaline earth metals, transition metals, post-transition metals, lanthanides and actinide series of elements.

"Oxide support" as used herein refers to any conventional refractory oxide supports well known in the art. These include, for example, alumina, silica, magnesia, thoria, titania, zirconia, silica-aluminas, silica-zirconias, magnesia-aluminas and the like. Other suitable supports include the naturally occurring clays such as diatomaceous earth. The oxide support as used herein has a molecular formula different from the perovskite-oxide as disclosed herein.

"Perovskite" and "perovskite-oxide" as used interchangeably herein to refer to compositions nominally designated as $ABO_3$, in which A is an alkaline earth element, a rare-earth element, an alkali metal element, a metal element or a combination thereof, and B is a transitional metal element, metal element, or a combination thereof. Representative elements for the A component include, but are not limited to, rare earth metal elements such as lanthanum, strontium, cerium, calcium, yttrium, erbium, praseodymium, neodymium, samarium, europium, silicon, magnesium, barium, niobium, lead, bismuth, and antimony or the like. Representative elements for the B component include, but are not limited to, transition metal elements such as iron, cobalt, manganese, copper, titanium, chromium, nickel, and molybdenum or the like. In some embodiments, A has a formula of $A^1_x A^2_y$, wherein x is 0-1, y is 0-1, and the sum of x and y is 1. In some embodiments, the A and B components of the perovskite-oxide as used herein are represented by $A^1_x A^2_y B^1_w B^2_z$, wherein x, y, w, and z are independently between 0-1 and the sum of x and y is 1 and the sum of w and z is 1. In some embodiments, the perovskite-oxide as used herein is represented by the formula $A_{a-x} B_x MO_b$, in which A is a mixture of elements originally in the form of single phase mixed lanthanides collected from bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$.

A "rare earth element" is one of seventeen chemical elements including the fifteen lanthanides, cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), terbium (Tb), thulium (Tm) and ytterbium (Yb), as well as scandium (Sc) and yttrium (Y).

"Surface termination" refers to the crystal surface facets of the perovskite oxide materials terminating in different elemental compositions, or alternatively, the surface facts are comprised of different elements. Based on reaction conditions or growth conditions, these surface terminations can relax, or change in bond distance, and often restructure themselves for better stability in a process called "surface reconstruction."

A "transition metal element" includes any element in groups 3-12 on the periodic table, as well as, the f-block lanthanide and actinide series.

2. CATALYST COMPOSITE COMPOSITIONS

A first aspect of the invention provides a catalyst composition comprising a perovskite-oxide of formula $ABO_3$, wherein A is an alkaline earth element, a rare-earth element, an alkali metal element, a metal element, or a combination thereof, and B is a transitional metal element, metal element, or a combination thereof and an oxide support having a formula different from the perovskite-oxide.

a) The Perovskite-Oxide

Perovskite-oxide generally refers to a structural class of mixed metal oxides, e.g. $ABO_3$ as defined herein, which are structurally analogous to the naturally occurring mineral perovskite ($CaTiO_3$). In a representative perovskite-oxide structure, the cations possess the appropriate relative sizes and coordination properties to form a cubic crystalline structure in which the smaller B site cations occupy the corners of unit cubes and the larger A site cations occupy the centers of the cubes. Oxygen ions are located at lattice sites which provide octahedral coordinations with B ions and dodecahedral coordination with A ions. Strained or distorted cubic crystal structures can result from variations in the sizes of the metal ions as well as variations in the valence of the metal ions.

Any thermodynamically stable perovskite-oxide capable of sustaining vacancies without deterioration may be suitable for the catalyst composite. In some embodiments, the perovskite-oxide has a formula of $ABO_3$, in which A is an alkaline earth element, a rare-earth element, an alkali metal element, a metal element, or a combination thereof. In some embodiments, A is Pb, Ca, Mg, Be, Sr, Ba, La, K, or Na, or a combination thereof. In other embodiments, A has the formula of $A^1_x A^2_y$, wherein $A^1$ and $A^2$ are independently Pb, Ca, Mg, Be, Sr, Ba, La, K, and Na, x is 0-1, y is 0-1, and the sum of x and y are 1. In some embodiments, x is about 0.2 to 0.8, 0.3 to 0.7, or 0.4 to 0.6. In some embodiments, y is about 0.2 to 0.8, 0.3 to 0.7, or 0.4 to 0.6. In certain embodiments, x is 0.75 and y is 0.25. In certain embodiments, $A^1$ is La and $A^2$ is Sr. In some embodiments, A has the formula of $A^1_x A^2_y$ and is $La_{0.75}Sr_{0.25}$.

In some embodiments, the perovskite-oxide has a formula of $ABO_3$, in which B is a transitional metal element, metal element, or a combination thereof. In some embodiments, B is selected from the group consisting of Fe, Ti, Y, Mn, Al, Cr, Co, Ta, Ni, and Ce, or a combination thereof. In some embodiments, B is Fe.

In some embodiments, the perovskite-oxide has a formula of $ABO_3$, in which A has a formula of $A^1_x A^2_y$, wherein $A^1$ is La, $A^2$ is Sr, and B is Fe. In certain embodiments, the perovskite-oxide is $La_{0.75}Sr_{0.25}FeO_3$.

In certain embodiments, the perovskite-oxide has a formula of $A^1 B^1_y B^2_{(1-y)} O_3$, in which y is 0.1 to 0.9, including 0.2 to 0.8, 0.3 to 0.7, or 0.4 to 0.6. In certain embodiments, the perovskite-oxide has a formula of $A^1_x A^2_{(1-x)} B^1_y B^2_{(1-y)} O_3$, in which x is 0.1 to 0.9, including 0.2 to 0.8, 0.3 to 0.7, or 0.4 to 0.6; and y is 0.1 to 0.9, including 0.2 to 0.8, 0.3 to 0.7, or 0.4 to 0.6.

In some embodiments, the perovskite-oxide has a cubic crystal structure wherein the oxygen atoms are at the edge centers.

b) The Oxide Support

Oxide supports may be any conventional refractory oxide supports. These include, for example, alumina, silica, magnesia, thoria, titania, zirconia, silica-aluminas, silica-zirconias, magnesia-aluminas and the like. Other suitable supports include the naturally occurring clays such as diatomaceous earth. In some embodiments, the oxide support as used herein may include $M^2$, which is a non-oxygen element, such as silica, zirconium, aluminum, titanium, or cerium.

In some embodiments, the oxide support is $CeO_2$, $ZrO_2$, $Al_2O_3$, $SiO_2$, $TiO_2$, or a combination thereof. In other embodiments, the oxide support is $CeO_2$, $ZrO_2$, or $SiO_2$. In certain embodiments, the oxide support is $SiO_2$. Suitable $SiO_2$ materials include various forms of $SiO_2$ known in the art (for example, SBA-15, which is a mesoporous form of $SiO_2$).

In some embodiments, the weight ratio of the perovskite-oxide to the oxide support is from 10:90 to 90:10. The weight ratio of the perovskite-oxide to the oxide support may be 10:90, 20:80, 30:70, 40:60, 50:50, 60:40, 70:30, 80:20 or 90:10. The weight ratio of the perovskite-oxide to the oxide support may be 25:75, 35:65, 45:55, 55:45, 65:35 or 75:25. In certain embodiments, the weight ratio of the perovskite-oxide to the oxide support is 25:75.

Upon forming a composite as disclosed herein, the oxide support may affect the physical crystal structure of the perovskite-oxide. In some embodiments, the oxide support induces strain in the crystal structure. In some embodiments, the oxide support may cause surface reconstruction and/or termination in the crystal structure of the perovskite-oxide. In some embodiments, the oxide support may regulate crystallite growth of active surfaces of the perovskite-oxide. The effects of surface reconstruction and/or termination, as well as regulation of crystallite growth of active surfaces, may be demonstrated by analytical methods known in the art, including for example XPS, XRD, and surface areas measurements.

c) The Catalyst Composite

Industrial-scale pellets are often shaped as spheres, cylinders, Raschig rings and other common variations with an extruded substrate serving as a catalyst support. The true potential of the use of a perovskite-oxide catalyst remains unrecognized due to a considerable lack of specific surface area.

In some embodiments, the surface area of the perovskite-oxide of the disclosed catalyst composite is between 1 and 1000 m$^2$/g. The surface area of the perovskite-oxides may be between 1 and 2 m$^2$/g, 1 and 5 m$^2$/g, 1 and 10 m$^2$/g, 1 and 100 m$^2$/g, 1 and 500 m$^2$/g, 1 and 750 m$^2$/g, 10 and 100 m$^2$/g, 10 and 500 m$^2$/g, 10 and 1000 m$^2$/g, 50 and 100 m$^2$/g, 50 and 500 m$^2$/g, 50 and 1000 m$^2$/g, 100 and 500 m$^2$/g, 100 and 100 m$^2$/g or 500 and 1000 m$^2$/g.

In some embodiments, the oxide support increases the surface area of the perovskite-oxide upon forming the disclosed catalyst composite. In some embodiments, the oxide support does not affect the surface area of the perovskite-oxide upon forming the disclosed catalyst composite.

In some embodiments, the oxide support increases the cell volume of the perovskite-oxide upon forming the disclosed catalyst composite. In some embodiments, the increased cell volume is due to increased strain in the perovskite structure. For example, as shown in Table 5, the oxide support (such as CeO$_2$, ZrO$_2$, Al$_2$O$_3$, SiO$_2$ or TiO$_2$) may enlarge the cell volume of the perovskite-oxide (such as LSF) as measured by the geometrical characteristics of the (020) diffraction line.

The size of the crystal structure can be measured as a lattice parameter or a crystallite size. A lattice parameter is the spacing of individual atoms comprising a repeating unit of the crystal. Crystallite size is a measurement that encompasses all the lattices in a repetitive structure, or repeating unit cells, until a defect or boundary ends the crystal. In some embodiments, the perovskite-oxide of the disclosed catalyst composite has a crystallite size of between 5 and 100 nm, including, but not limited to, between 5 and 10 nm, between 5 and 20 nm, between 5 and 30 nm, between 5 and 40 nm, between 5 and 50 nm, between 5 and 60 nm, between 5 and 70 nm, between 5 and 80 nm, between 5 and 90 nm, between 10 and 100 nm, between 20 and 100 nm, between 30 and 100 nm, between 40 and 100 nm, between 50 and 100 nm, between 60 and 100 nm, between 70 and 100 nm, between 80 and 100 nm, between 90 and 100 nm, between 10 and 90 nm, between 20 and 80 nm, between 30 and 70 nm, and between 40 and 60 nm.

3. METHODS OF PREPARING THE CATALYST COMPOSITE COMPOSITIONS

Another aspect of the invention provides a method for preparing a catalyst composite comprising (a) mixing a perovskite-oxide of formula ABO$_3$ with an oxide support having a formula different from the perovskite-oxide to form a mixture, wherein A is an alkaline earth element, a rare-earth element, an alkali metal element, a metal element, or a combination thereof, B is a transitional metal element, a metal element, or a combination thereof; and (b) heating the mixture to a temperature of 600° C. to 1300° C. In some embodiments, the perovskite-oxide of step (a) has a cubic crystal structure, the O atoms being at the edge centers. In some embodiments, the perovskite-oxide adheres to the oxide support in step (b), and the oxide support induces strain in the crystal structure, causes surface reconstruction/termination, and/or regulates crystallite growth of active surfaces of the perovskite-oxide in step (b).

In some embodiments, disclosed is a method for preparing a catalyst composite comprising: (a) mixing a perovskite-oxide of formula ABO$_3$ with an oxide support having a formula different from the perovskite-oxide to form a mixture, wherein A is an alkaline earth element, a rare-earth element, an alkali metal element, a metal element, or a combination thereof, B is a transitional metal element, a metal element, or a combination thereof, and wherein the perovskite-oxide has a cubic crystal structure, the O atoms being at the edge centers; and (b) heating the mixture to a temperature of 600° C. to 1300° C., whereby the perovskite-oxide adheres to the oxide support, and the oxide support induces strain in the crystal structure, causes surface reconstruction/termination, and/or regulates crystallite growth of active surfaces of the perovskite-oxide.

In some embodiments, the perovskite-oxide used in the disclosed method has a formula of ABO$_3$, in which A is Pb, Ca, Mg, Be, Sr, Ba, La, K, or Na, or a combination thereof. In other embodiments, A has the formula of $A^1{}_xA^2{}_y$, wherein $A^1$ and $A^2$ are independently Pb, Ca, Mg, Be, Sr, Ba, La, K, and Na, x is 0-1, y is 0-1, and the sum of x and y are 1. In some embodiments, A is $A^1{}_xA^2{}_y$, in which x is 0.1-0.9, such as 0.2 to 0.8, 0.3 to 0.7, or 0.4 to 0.6. In some embodiments, y is 0.1 to 0.9, such as 0.2 to 0.8, 0.3 to 0.7, or 0.4 to 0.6. In certain embodiments, A is $A^1{}_xA^2{}_y$, in which x is 0.75 and y is 0.25. In certain embodiments, A is $A^1{}_xA^2{}_y$, in which $A^1$ is La and $A^2$ is Sr. In some embodiments, A has the formula of $A^1{}_xA^2{}_y$ and is La$_{0.75}$Sr$_{0.25}$.

In some embodiments, the perovskite-oxide used in the disclosed method has a formula of ABO$_3$, in which B is selected from the group consisting of Fe, Ti, Y, Mn, Al, Cr, Co, Ta, Ni, and Ce, or a combination thereof. In some embodiments, B is Fe.

In some embodiments, the perovskite-oxide used in the disclosed method has a formula of ABO$_3$, in which A is $A^1{}_xA^2{}_y$, $A^1$ is La, $A^2$ is Sr, and B is Fe. In certain embodiments, the perovskite-oxide is La$_{0.75}$Sr$_{0.25}$FeO$_3$.

The disclosed perovskite-oxides can be made by any method know in the art, including, for example, a modified Pechini method, a sol gel method, precipitation, a hydrothermal method or a solid state method. In some embodiments, the perovskite-oxide is calcined before mixing with the oxide support.

In some embodiments, the oxide support is CeO$_2$, ZrO$_2$, Al$_2$O$_3$, SiO$_2$, TiO$_2$, or combinations thereof. In other embodiments, the oxide support is CeO$_2$, ZrO$_2$ or SiO$_2$. In certain embodiments, the oxide support is SiO$_2$.

In some embodiments, the weight ratio of the perovskite-oxide to the oxide support is from 10:90 to 90:10. The weight ratio of the perovskite-oxide to the oxide support may be 10:90, 20:80, 30:70, 40:60, 50:50, 60:40, 70:30, 80:20 or 90:10. The weight ratio of the perovskite-oxide to the oxide support may be 25:75, 35:65, 45:55, 55:45, 65:35 or 75:25. In certain embodiments, the weight ratio of the perovskite-oxide to the oxide support is 25:75.

Any mixing methods known in the art may be used to combine the perovskite-oxide with the oxide support. In some embodiments, the mixing may be accomplished by grinding, ball milling, drum tumbling, or solution based methods.

The mixture may be heated to a temperature of 600° C. to 1300° C. as needed to ensure that the perovskite-oxide adheres to the oxide support. In some embodiments the mixture is heated to a temperature of about 600° C., about 650° C., about 700° C., about 750° C., about 800° C., about 850° C., about 900° C., about 950° C., about 1000° C., about 1050° C., about 1100° C., about 1150° C., about 1200° C., about 1250° C., or about 1300° C.

The mixture of the oxide support and perovskite-oxide disclosed herein may lead to the spontaneous formation of one or more secondary phases at elevated temperatures. These secondary phases may be the result of the conversion of the perovskite-oxide into a nonstoichiometric form. In some embodiments, heating the mixture causes the formation of secondary phases due to solid state reactions between the perovskite-oxide and the oxide support. In some embodiments, the secondary phases are of formula of $M^1_p M^2_q O_v$, wherein $M^1$ is A or B component of the disclosed perovskite-oxide (having a formula of $ABO_3$), $M^2$ is the non-oxygen element of the oxide support, p is 1-3, q is 1-3, and v is 2-7.

In general, $M^1$ in the secondary phases is the A or B element of the perovskite-oxide used herein to form the composite catalyst. In some embodiments, $M^1$ is A, which is selected from group consisting of Pb, Ca, Mg, Be, Sr, Ba, La, K, and Na. In some embodiments, $M^1$ is B, which is from group consisting of Fe, Ti, Y, Mn, Al, Cr, Co, Ta, Ni and Ce.

In general, $M^2$ in the secondary phases is a non-oxygen element of the oxide support used herein to form the composite catalyst. In some embodiments, $M^2$ is Ce, Zr, Al, Si, or Ti. In certain embodiments, the secondary phases are $FeSiO_3$ and $La_2SiO_5$.

The secondary phases may be produced in minor to trace amounts in comparison to the stoichiometric form of the perovskite-oxide. In some embodiments, the secondary phases comprise less than 2% by weight of the catalyst composite. In some embodiments, the secondary phases comprise less than 1.5% by weight of the catalyst composite. In some embodiments, the secondary phases comprise less than 1% by weight of the catalyst composite. In some embodiments, the secondary phases comprise less than 0.5% by weight of the catalyst composite. In some embodiments, the secondary phases comprise between 0.5 and 1% by weight of the catalyst composite.

Figure 2A:
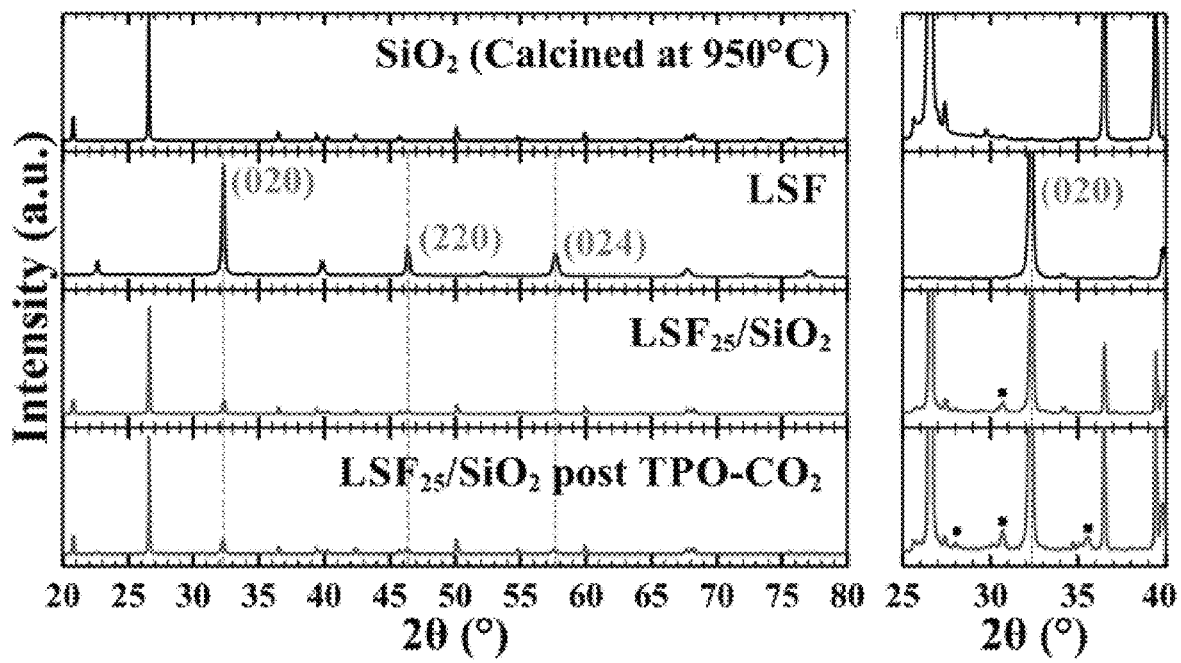
FIG. 2A shows the X-ray diffraction patterns of fresh and post Temperature Programmed Oxidation (TPO) of $CO_2$ $LSF_{25}/SiO_2$ with constituents and closer inspection of 25-40 2θ range to show the emergence of secondary phases.
Figure 2B:
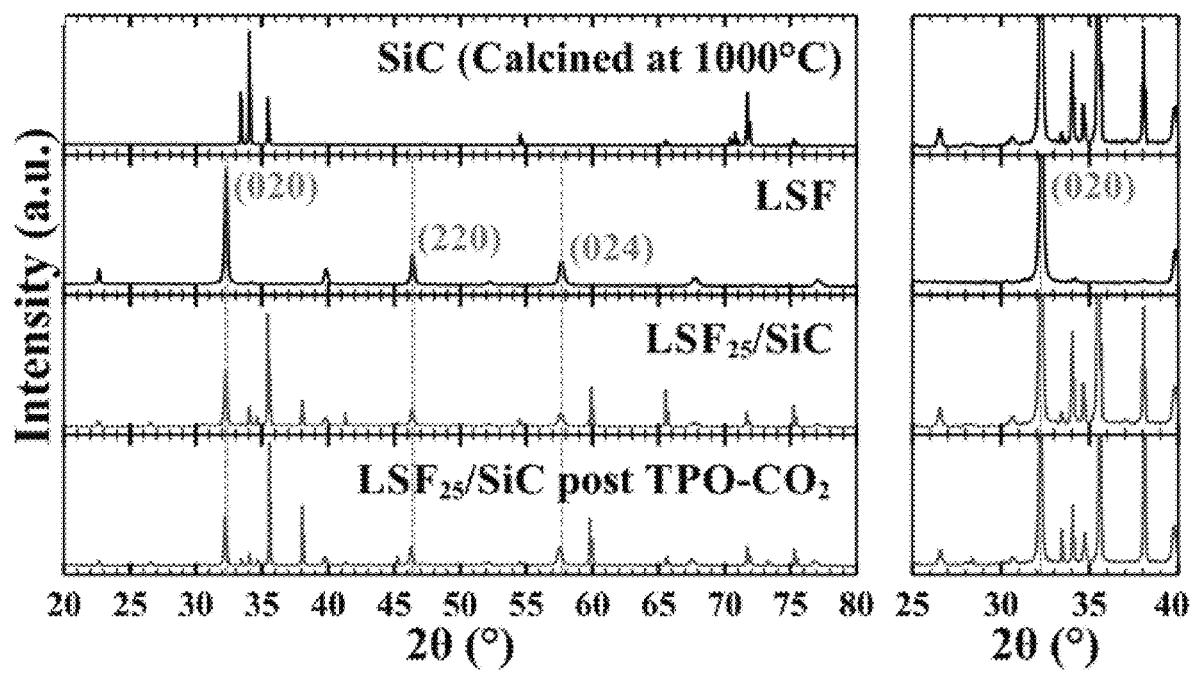
FIG. 2B shows the X-ray diffraction patterns of fresh and post $TPO-CO_2$ $LSF_{25}/SiC$ with constituents and closer inspection of the aforementioned range to show the absence of secondary phases.
Figure 2C:
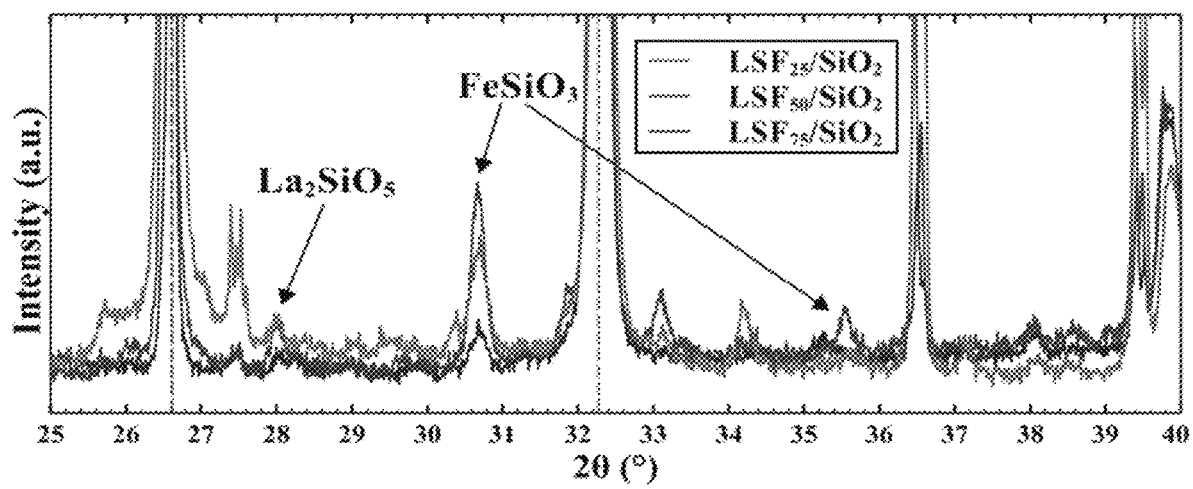
FIG. 2C shows the X-ray diffraction patterns of $LSF_X/SiO_2$ (X=25, 50, 75) in which each show a presence of secondary phases.

In some embodiments, the perovskite-oxide catalyst is $LSF_{25}$, the oxide support is $SiO_2$, and the catalyst composite is characterized by an X-ray diffraction pattern shown in FIG. 2A. In some embodiments, the perovskite-oxide catalyst is $LSF_X$ (X is 25, 50, or 75), the oxide support is $SiO_2$, and the catalyst composite is characterized by the corresponding X-ray diffraction patterns shown in FIG. 2C. In some embodiments, the perovskite-oxide catalyst is $LSF_{25}$, the oxide support is $CeO_2$, $ZrO_2$, $Al_2O_3$ or $TiO_2$ and the catalyst composite is characterized by an X-ray diffraction pattern shown in FIG. 9B, FIG. 9C, FIG. 9D, or FIG. 9E, respectively.

4. METHODS OF USE

Another aspect of the invention provides a method for converting $CO_2$ to CO comprising (a) contacting $H_2$ with the catalyst composite of claim 1, whereby the perovskite-oxide is reduced, and whereby $H_2$ is oxidized to produce $H_2O$ and (b) contacting $CO_2$ with the catalyst composite, whereby the reduced perovskite-oxide is oxidized, and whereby $CO_2$ is reduced to produce CO.

Without being limited by any theory, the reverse water gas shift chemical looping (RWGS-CL) process as disclosed herein may include a two-step process that simultaneously reduces net $CO_2$ emissions and provides a pathway for renewable hydrocarbon production from synthesis gas. As described herein and shown in FIG. 1, mixed metal oxides such as perovskite-oxides ($ABO_3$) may be used for generation of 100% selective CO from $CO_2$. The first step may result in the partial reduction of perovskite-oxides to their oxygen deficient forms ($ABO_{3-\delta}$) under exposure to hydrogen. The second step is the platform for converting $CO_2$ to CO over these oxygen vacant perovskites, allowing the oxides to regain their original stoichiometric forms ($ABO_3$). This cyclic operation converts $CO_2$ to CO, which can be subsequently converted to hydrocarbons via Fischer-Tropsch synthesis.

In some embodiments, the method for converting $CO_2$ to CO is carried out isothermally at a temperature between 450° C. and 800° C., including, but not limited to, between 500° C. and 800° C., between 550° C. and 800° C., between 600° C. and 800° C., between 650° C. and 800° C., between 700° C. and 800° C., between 750° C. and 800° C., between 450° C. and 500° C., between 450° C. and 550° C., between 450° C. and 600° C., between 450° C. and 650° C., between 450° C. and 700° C., between 450° C. and 750° C., between 500° C. and 550° C., between 500° C. and 600° C., between 500° C. and 650° C., between 500° C. and 700° C., between 500° C. and 750° C., between 550° C. and 600° C., between 550° C. and 650° C., between 550° C. and 700° C., between 550° C. and 750° C., between 600° C. and 650° C., between 600° C. and 700° C., between 600° C. and 750° C., between 650° C. and 700° C., between 650° C. and 750° C., and between 700° C. and 750° C. In certain embodiments, the disclosed method of converting $CO_2$ to CO is carried out isothermally at a temperature of between 500° C. and 700° C., such as between 550° C. and 650° C., and between 580° C. and 620° C. In certain embodiments, the disclosed method of converting $CO_2$ to CO is carried out isothermally at 600° C.

In some embodiments, the method for converting $CO_2$ to CO is carried out at two different temperatures, one temperature for step (a) and one temperature for step (b).

In some embodiments, the temperature of step (a) is between 400° C. and 850° C. The temperature of step (a) may be about 400° C., about 450° C., about 500° C., about 550° C., about 600° C., about 650° C., about 700° C., about 750° C., about 800° C. or about 850° C.

In some embodiments, the temperature of step (b) is between 450° C. and 900° C. The temperature of step (a) may be about 450° C., about 500° C., about 550° C., about 600° C., about 650° C., about 700° C., about 750° C., about 800° C., about 850° C. or about 900° C.

Figure 4A:
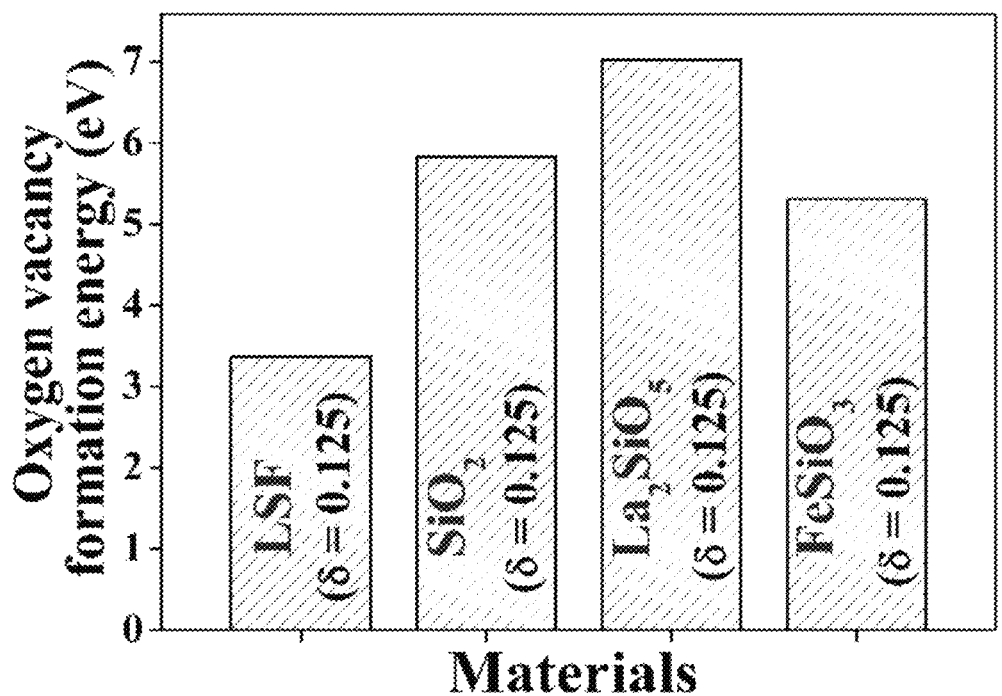
FIG. 4A shows the DFT calculations for Oxygen vacancy formation energies for each oxide species identified in the composite materials. δ represents the extent of oxygen vacancy formation. A value of 0.125 was chosen for consistent comparison.
Figure 4B:
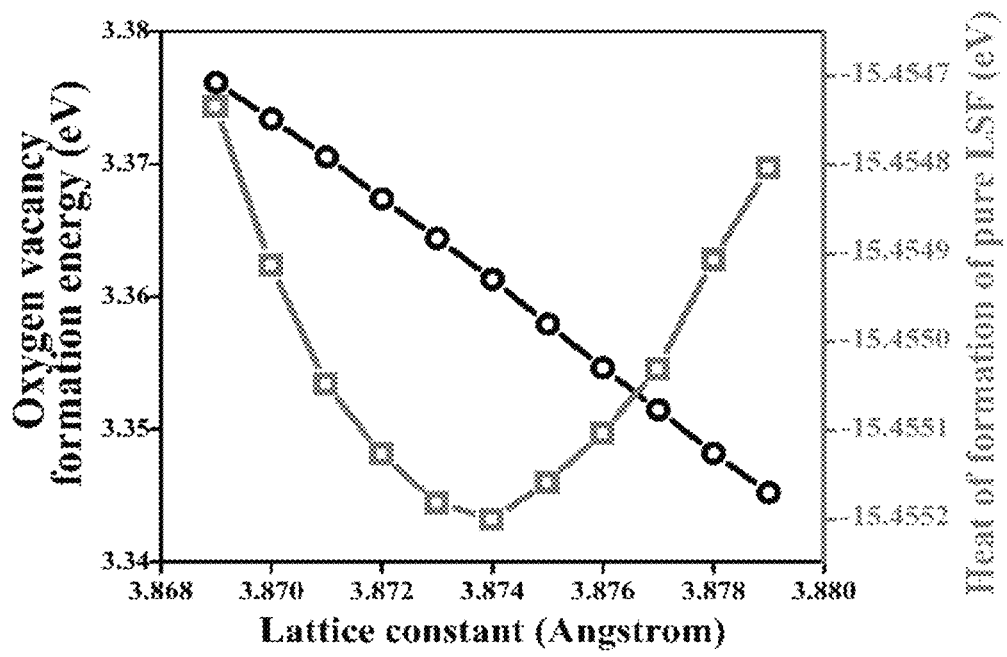
FIG. 4B shows the variation of oxygen vacancy formation energy with lattice strain.
Figure 10:
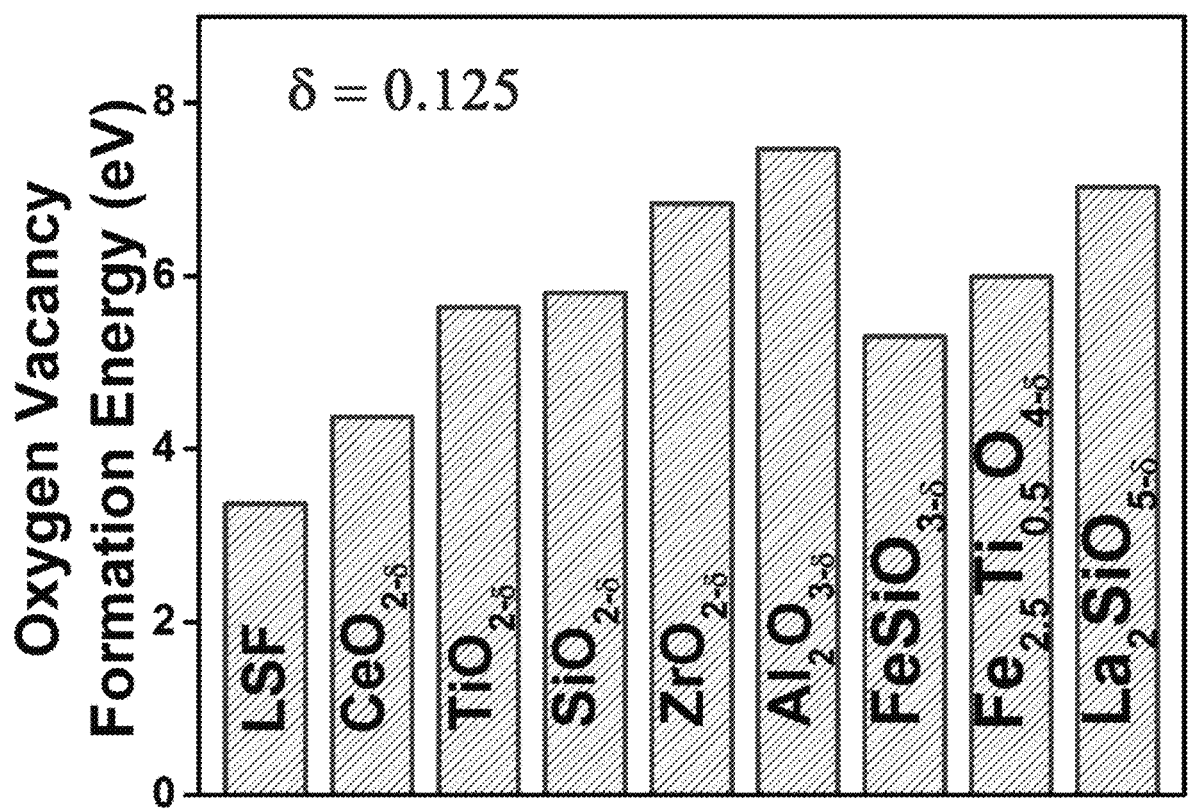
FIG. 10 shows DFT-calculated oxygen vacancy formation energies of LSF, supporting materials, and detected secondary phases. δ represents the extent of oxygen nonstoichiometry for each support.

Oxygen vacancy formation energies ($E_{vac}$) serve as descriptors for the ability of an oxide material to convert $CO_2$. In some embodiments, the oxygen vacancy formation energy for the supporting materials in the disclosed catalyst composite may have a value of at least 4 eV, such as a value between 4 eV and 8 eV, as calculated at $\delta=0.125$ ($\delta$ represents the extent of oxygen vacancy formation), as shown in FIG. 10. In some embodiments, the oxygen vacancy formation energy for the perovskite oxide in the disclosed catalyst composite may have a value of at less than 4 eV, such as a value between 2 eV and 4 eV, as calculated at δ=0.125, as shown in FIG. 4B.

In some embodiments, the CO is produced at a rate of 0.5 to 1 mmol CO/g perovskite-oxide/min. the CO may be produced at a rate of about 0.5 mmol CO/g perovskite-oxide/min, about 0.6 mmol CO/g perovskite-oxide/min, about 0.7 mmol CO/g perovskite-oxide/min, about 0.8 mmol CO/g perovskite-oxide/min, about 0.9 mmol CO/g perovskite-oxide/min or about 1 mmol CO/g perovskite-oxide/min.

In some embodiments, CO is produced at a rate greater using the process with the catalyst composite than the process using a perovskite-oxide without the oxide support. In some embodiments, there is up to a 200% increase in CO production. In some embodiments, there is up to a 150% increase in CO production. In some embodiments, there is up to a 100% increase in CO production. In some embodiments, there is up to a 50% increase in CO production.

In some embodiments, step (a) and step (b) are repeated in succession. Step (a) and step (b) may be repeated in succession as many times as needed until a certain quantity of CO is produced. Step (a) and step (b) may be repeated at least 5 times in succession, at least 10 times in succession, at least 20 times in succession, at least 25 times in succession, at least 30 times in succession, at least 40 times in succession, at least 50 times in succession In some embodiments, the process further reduces the perovskite-oxide surface area. The perovskite-oxide surface area may be reduced by up to 25%. The perovskite-oxide surface area may be reduced by up to 20%. The perovskite-oxide surface area may be reduced by up to 15%. The perovskite-oxide surface area may be reduced by up to 10%. The perovskite-oxide surface area may be reduced by up to 5%.

In some embodiments, the process further comprises wetting of the catalyst composite.

5. EXAMPLES

Example 1. Materials & Methods

Material Synthesis: A sol gel-based Pechini method was used to synthesize the $La_{0.75}Sr_{0.25}FeO_3$ (LSF) perovskite-oxide similar to that proposed by Popa and Kakihana (*Solid State Ionics* 2002, 151, 251-257). Using citric acid (CA) (Aldrich>99.5%) as a chelating agent, a 2 M aqueous solution was made with deionized water. Metal precursors $La(NO_3)_3$ (Aldrich 99.9%), $SrCO_3$ (Aesar 99.994%), and $Fe(NO_3)_3$ (Aldrich ACS grade+98%) were each dissolved into the CA solution followed by 2 hr of stirring (200 rpm) at 60° C. to minimize mixture variations. Ethylene glycol (EG) (Aldrich>99%) was then added to induce polyesterification as the solution was stirred for 7 hr at 90° C. All reagents were measured to achieve a La:Sr:Fe:CA:EG molar ratio of 0.75:0.25:1.0:10:40. The resulting dark red viscous gel was immediately charred at 450° C. (25° C./min) for 2 hr. The solidified residue was crushed into powder and further calcined in air at 950° C. (25° C./min) for 6 hr to finalize the crystallization of LSF. The perovskite was then combined with silica (quartz, Sigma-Aldrich purum) to obtain a composite material of mass ratios 25%, 50%, and 75% LSF. In some cases, the resulting catalyst was then combined with $CeO_2$, $ZrO_2$, $Al_2O_3$(Sigma-Aldrich puriss corundum), $SiO_2$ (Sigma-Aldrich purum quartz) and $TiO_2$ (Alfa Aesar 99.5% rutile) at 25% by mass. Black silicon carbide 70 grit (Panadyne Abrasives) was also included as a support but was first subjected to thermal pretreatment at 1000° C. for 2 hr to achieve crystalline phases that would remain stable throughout high-temperature $TPO-CO_2$ experiments. LSF and the respective materials (X % w/w LSF/support) were grinded together by hand in a mortar and pestle for about 15 min and then heated in air at 950° C. for 10 hr to achieve aggregation of constituents and to ensure strong adhesion of the perovskite phase to the support particles. $CeO_2$ and $ZrO_2$ in particular were acquired by thermolysis of $Ce(NO_3)_3$ (Alfa Aesar 99.5%) and $ZrO(NO_3)_2$ respectively at 600° C.

Temperature-Programmed Experiments: About 75 mg of each sample was positioned between glass wool within a quartz U-tube. The quartz reactor was then placed within a Thermo Scientific furnace in which the heating ramp was held constant at 10° C./min for all temperature-programmed experiments. The total flow rate was maintained at 50 sccm using Alicat mass flow controllers and consisted of ultra-high purity (UHP) grade gases supplied by Airgas. A MKS Cirrus mass spectrometer (MS) was used to monitor changes in gas flow composition over time. For temperature-programmed reductions (TPR), gas signals were permitted to stabilize at ambient temperature once the initial flow was adjusted to 10% $H_2$ in Helium (He) (v/v). The temperature was then increased to 950° C. (10° C./min) and held constant until the m/z=18 signal, representing $H_2O$, was steady. The TPR profiles revealed a generalized peak reduction temperature for the material set. For temperature-programmed oxidations ($TPO-CO_2$), each sample was heated under 10% $H_2$ in He (v/v) flow at 600° C. for 30 min. The oxygen-deficient perovskite material was allowed to cool naturally under He to about 100° C. to maintain vacancies. The material was then exposed to a 10% $CO_2$ in He (v/v) flow and heated to 950° C. (10° C./min) and CO generation was represented by peak formation in the m/z=28 signal. Quantitative analysis of the resulting data followed procedures previously described.

Structural Characterization: X-ray diffraction was used to probe fresh and post-experimental samples. Main interests included changes in crystalline structure or secondary phases concomitant with solid-state reactions. A Bruker X-Ray Diffractometer with Cu Kα (λ=0.154 nm) provided patterns at ambient conditions from 20 to 80° (2θ°) with a step size of 0.0102 (2θ°) and 1.2 seconds per step. Raw data and literature patterns from X'Pert Highscore Plus software were juxtaposed for reference when calculating lattice parameters and LSF orthorhombic cell dimensions in pre-calcination, post-calcination and post-experiment samples. This assay consisted of indexing using Bragg's Law and unique geometrical and interplanar distance equations. Library reference codes are provided when necessary. A Scherrer analysis was also done with a shape factor of 0.9, an acceptable approximation, across the width of the primary LSF (020) diffraction line, given the assumption of spherical perovskite particles. This permitted the comparison of crystalline sizes and surface areas of supported and unsupported LSF and the estimation of the change in LSF crystallite size throughout the material lifetime.

Rietveld refinement using Topas 5 software was performed on the LSF control sample diffraction pattern to ensure the accuracy of the raw data and numerical calculations with atomic coordinates provided by Dann et al. (J. Solid State Chem. 1994). A PV peak type was chosen in Topas 5 software. The profile shape functions for the full width half maximum (FWHM) and PV mixing parameter ($\eta$) are shown as Equations S1 and S2 respectively. They consist of refinable FWHM parameters ($a_h$, $b_h$, $c_h$) and Lorentzian mix parameters ($a_{lor}$, $b_{lor}$, $c_{lor}$)

$$FWHM = \alpha_h + b_h \tan(\theta) + \frac{c_h}{\cos(\theta)} \quad (S1)$$

$$\eta = a_{lor} + b_{lor}\tan(\theta) + \frac{c_{lor}}{\cos(\theta)} \quad (S2)$$

FTIR spectroscopy (attenuated total reflectance (ATR)) was performed on all the perovskite-support samples in the Nicolet IS50 instrument from Thermo-Scientific. All the spectra comprised of 50 scans, taken at a resolution of 0.241 cm$^{-1}$ having a data spacing of 0.482 cm$^{-1}$.

X-ray photoelectron spectrometry (XPS) data was acquired with a Thermo Scientific K-Alpha spectrometer. The instrument utilized K$\alpha$ radiation and a dwell time of 0.5 s. The C1s peak was identified at 285.18 eV.

Microscopy: A Tecnai F20 transmission electron microscope (TEM) was used for high resolution imaging of LSF particle development after composite synthesis and reaction testing. A Schottky Field emitter sufficed as the electron source with minimal energy spread (<0.7 eV) and a point resolution of 0.24 nm. With a line resolution of 0.102 nm, the (020) plane of LSF was probed to calculate the interplanar spacing which remained consistent with crystallographic data.

A Field Emission Scanning electron microscope (SEM), accompanied with energy-dispersive spectroscopy (EDS), was used for precise imaging and elemental analysis of the post-calcination and post-experiment perovskite phases. The Hitachi S800 SEM with EDS attachment was operated with 2 nm resolution at a working distance of 5 mm.

Physisorption: Specific surface areas were obtained using Quantachrome Autosorb IQ analyzer. After degassing at 300° C. Adsorption-desorption isotherms were obtained by measuring volume adsorbed by the sample at a set interval of partial pressures (P/P$_0$) using N$_2$ as the adsorbate at 77 K. Specific surface area was calculated using Brunauer-Emmet-Teller (BET) method using adsorption data points inside the P/P$_0$ range of 0.05 to 0.3.

Chemical Looping: LSF$_{25}$/SiO$_2$, LSF$_{25}$/SiC, and unsupported LSF were each tested in eight consecutive isothermal cycles of reverse water gas shift chemical looping (RWGS-CL). Maintaining a total flow rate of 50 sccm throughout the entire experiment, the process began with a 20 min period of 10% H$_2$ in He (v/v) to reduce the perovskite, thus instigating oxygen vacancy formation. Helium was flowed again for 20 min before changing the flow to 10% CO$_2$ in He (v/v) to re-oxidize the perovskite material and generate CO. H$_2$O and CO production was quantified for each cycle using the same procedures for TPO-CO$_2$ to test reaction capability and durability over elongated use.

Density-Functional Theory (DFT): All the DFT calculations were performed using plane wave basis sets and GGA electron densities using VASP-5.3.3. Projected augmented wave (PAW) potentials were used for treating the core electronic densities. Perdew-Burke-Ernzerhof (PBE) exchange correlation was used. For the study of LSF, a 2×2×2 supercell of 40 atoms (consisting 'n'=8 unit cells) was used. And hence creating an oxygen vacancy extent ($\delta$) of 0.125 involved removing only one oxygen atom. An average of oxygen vacancy formation energies over different perovskite locations has been reported. The crystal structures of these materials were based on the experimental results as obtained from XRD patterns. The atomic distribution within the crystal lattice was based on the minimum energy configuration as per DFT-calculations. A 4×4×4 k-point mesh having Monkhorst Pack grid was generated and was used throughout all calculations over LSF. For other materials like silica, FeSiO$_3$ and La$_2$SiO$_5$, k-points were set so as to maintain to similar k-point grid spacing. Throughout the calculations, an energy cut off (ENCUT) value of 600 eV was used. In regards to oxygen vacancy formation energy calculations, oxygen over-binding has been accounted for as well. The heat of formation (H$_f$) of the perovskite-oxide was calculated as per the equation H$_f$=E$_{LSF}$-$\Sigma_i \mu_i$, where E$_{LSF}$ is LSF's calculated total energy from DFT and $\mu_i$ is the ground state fitted elemental reference energy for each of La, Sr, Fe and O. The oxygen vacancy formation energies were calculated as per the equation $$E_{vac} = E_{MO_{(x-\delta)}} + \delta \times \frac{n}{2} E_{O_2} - E_{MO_x}$$

where, $E_{MO_x}$ is the total energy of the stoichiometric materials (LSF and the metal oxides), n is the number of unit cells in a one supercell, while $E_{MO_{(x-\delta)}}$ is that of the oxygen vacant material and $E_{O2}$ is the molecular energy of oxygen. The correction factor for oxygen over-binding error (for PBE functionals) by Wang et al. (Wang, L.; Maxisch, T.; Ceder, G. Oxidation energies of transition metal oxides within the GGA+U framework. *Phys. Rev. B*, 2006, 73, 195107) was considered as well.

Example 2. Structural Characterization

Table 1 consists of each sample synthesized, characterized, and tested with its respective nomenclature. X-ray diffraction (XRD) patterns of La$_{0.75}$Sr$_{0.25}$FeO$_3$ (LSF) and SiO$_2$ along with that of the LSF$_{25}$/SiO$_2$ amalgam (25% by weight of LSF) are reported in FIG. 2A. The composite sample indicated the dominant presence of pure phase silica (hexagonal quartz [Ref. Code: 00-046-1045]) and LSF phases (orthorhombic structure [Ref Code: 00-035-1480]). Closer inspection of the 25-40 2θ° (FIG. 2A) range revealed formation of secondary phases FeSiO$_3$ and La$_2$SiO$_5$ in minor amounts. These became more prominent after H$_2$-reduction and subsequent temperature-programmed oxidation under CO$_2$ (TPO-CO$_2$) experiments. The LSF-SiO$_2$ interface region of the composite material was the most vulnerable to solid state reactions. Yet FeSiO$_3$ and La$_2$SiO$_5$ were present as traces and exhibited no adverse effects on the long-term stability of the composite. SiC was used as non-oxygen based reference support to test the effect of Si on stability, secondary phase formation, and CO$_2$ conversion performance of perovskite:SiC mixtures. The diffraction pattern of the SiC-based amalgam illustrated an absence of any secondary phases, even after H$_2$-reduction and subsequent TPO-CO$_2$, as evident from FIG. 2B and FIG. 2C.

TABLE 1

Sample nomenclature for perovskite composites synthesized
and tested in temperature programmed experiments.

| LSF/support | | Sample | LSF orthorhombic lattice parameters of fresh samples (Å)[‡] | | | LSF Cell Volume ($Å^3$) | $FeSiO_3$ XRD R.I. [a] | $La_2SiO_5$ XRD R.I. [a] | BET SSA ($m^2 g^{-1}$) |
|---|---|---|---|---|---|---|---|---|---|
| (X % w/w) | | | a | b | c | | | | |
| None | | LSF | 5.5107 | 5.5407 | 7.7927 | 237.93 | — | — | 1.9 |
| Quartz (silica) | 25% LSF | $LSF_{25}/SiO_2$ | 5.5181 | 5.5321 | 7.8137 | 238.53 | 1.35% | 0.76% | 1.1 [c] |
| | 50% LSF | $LSF_{50}/SiO_2$ | 5.5224 | 5.5375 | 7.8263 | 239.33 | 1.74% | 0.72% | — |
| | 75% LSF | $LSF_{75}/SiO_2$ | 5.5329 | 5.5269 | 7.8254 | 239.30 | 0.71% | 0.50% | — |
| Black Silicon carbide 70 grit | | $LSF_{25}/SiC$ | 5.5278 | 5.5313 | 7.8223 | 239.18 | n.d. [b] | n.d. [b] | — |

Figure 2D:
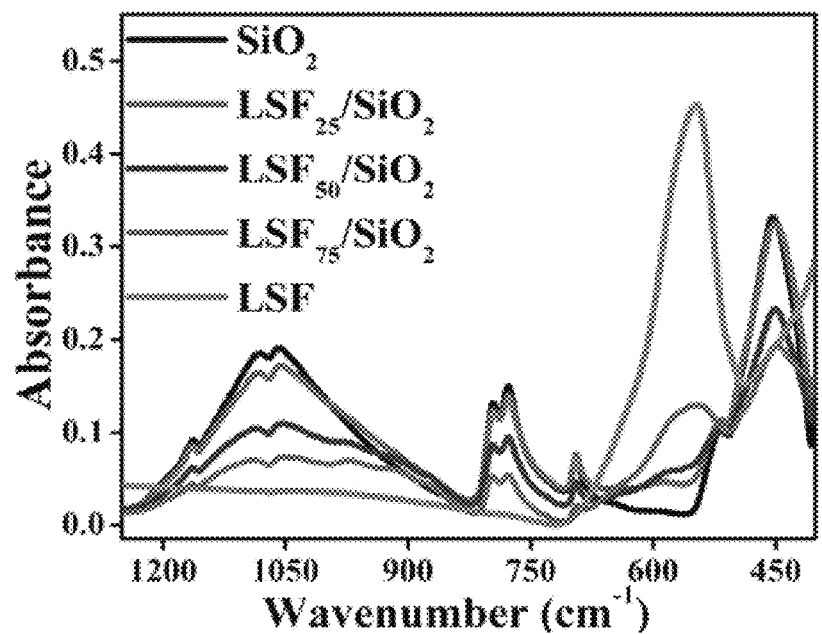
FIG. 2D shows the Fourier transform infrared spectra of $LSF_X/SiO_2$ (X=25, 50, 75) in which each illustrate the consistent decrease in silica content at 1080 $cm^{-1}$ with increasing LSF content.

[‡]The orthorhombic lattice parameters of LSF in fresh samples are calculated using Ref. Code: 00-035-1480 from the X'Pert Highscore Plus data library. The BET specific surface areas (SSA) are also included for certain samples.
[a] Relative intensities of secondary phase diffraction lines with respect to the dominant crystalline Miller index
[b] Nothing detected
[c] Quartz SSA (after heat treatment at 950° C.): 1.7 $m^2 g^{-1}$ The presence of secondary phases ($FeSiO_3$ and $La_2SiO_5$) in the LSF/$SiO_2$ composites can be consequential to perovskite grain characteristics and $CO_2$ conversion performance. Therefore, different ratios of LSF and $SiO_2$ were tested, resulting in varying concentrations of these phases evident from the relative peak intensities (R.I) at 28.0, 30.6, and 35.5 2θ° (FIG. 2D). The R.I. of the primary diffraction pattern affiliated with orthorhombic $FeSiO_3$ (Ref. Code: 01-076-0886) changed from 1.35% to 1.74% to 0.71% with increasing LSF content (25% to 75%) as indicated in Table 1. The (−202) XRD peak of monoclinic $La_2SiO_5$ (Ref. Code: 00-040-0234) however, remained relatively constant between 0.76% and 0.50% possibly due to high activation energies for La ion migration in perovskites with short O—Fe—O and O—O distances in the lattice. Silica phase transition from quartz to tridymite, a typically lethargic transformation even with alkali promoters, was negligible. Overall, apart from the minor formation of secondary phases, which remained stable over several $CO_2$ conversion cycles, orthorhombic LSF and hexagonal $SiO_2$ phases maintained dominancy. Fourier transform infrared spectroscopy (FTIR) results, shown in FIG. 2D, confirmed a consistent trend of decreasing silica peak at 1080 $cm^{-1}$ with increasing LSF in the composites. A notable trend observed in the LSF:$SiO_2$ amalgams was the change in orthorhombic cell volume with different ratios as reported in Table 1. This pattern was complementary with the formation of secondary phases as shown in FIG. 2D. The generation of secondary phases along with surface wetness resulted in interfacial strain and a slight increase in the cell volume as previously witnessed in interfacial layers between $SiO_2$ and complex Sr oxides. Calculation of the LSF crystallite size via Scherrer analysis revealed the role of supports in restricting the perovskites from sintering during RWGS-CL experiments as documented in Table 2. This particular role of supports in tuning the LSF crystallite size and strain was fundamental for exploring the underlying mechanism of $CO_2$ conversion over these composites.

TABLE 2

Crystallite size estimations by Scherrer analysis for fresh and post RWGS-CL experimentsamples with CO formation rates on the estimated LSF surface area for the final cycle

| Sample | Fresh perovskite crystallite size (Å) | Post RWGS-CL perovskite crystallite size (Å) | CO formation rate per LSFsurface area (mmol CO $(m^2_{LSF})^{-1}$ $min^{-1}$) [a] |
|---|---|---|---|
| LSF | 350.9 | 350.9 | 0.49 |
| $LSF_{25}/SiO_2$ | 351.2 | 269.1 | 0.64 (0.70 [b]) |
| $LSF_{25}/SiC$ | 384.6 | 336.3 | 0.18 |

[a]Based on LSF surface area when alone and estimated surface area based on changes in crystallite size and proportions of total SSA
[b]Estimated on BET SSA (assumes equivalent surface areas per phase)

Example 3. Temperature-Programmed $CO_2$ Conversion Experiments

Figure 3A:
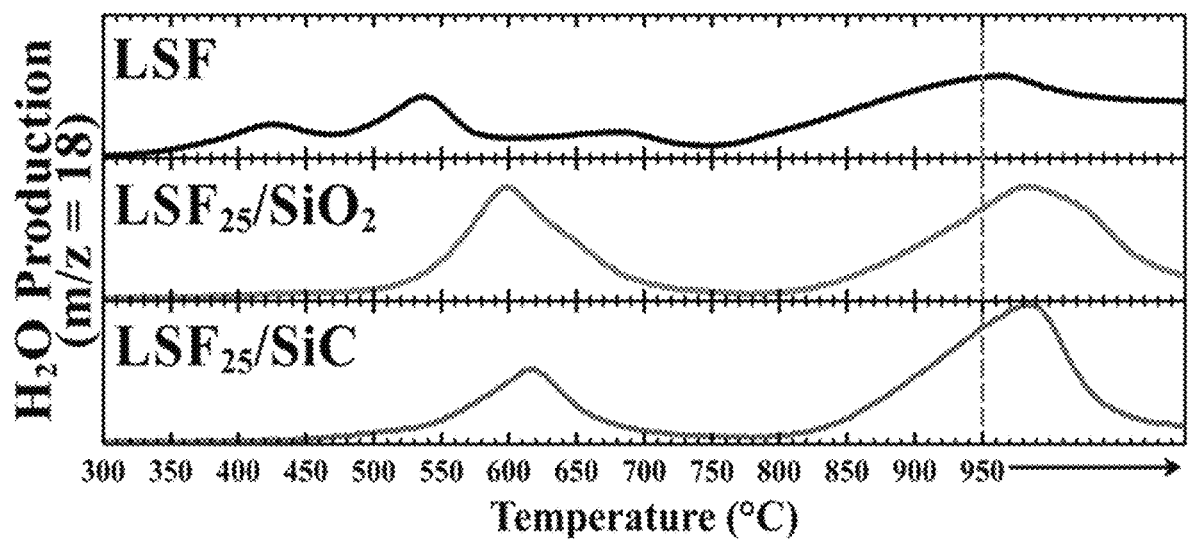
FIG. 3A shows the temperature-programmed experimental data for $H_2O$. Temperature Programmed Reduction (TPR) spectra show 600° C. is an adequate temperature for partial reduction of the materials.
Figure 3B:
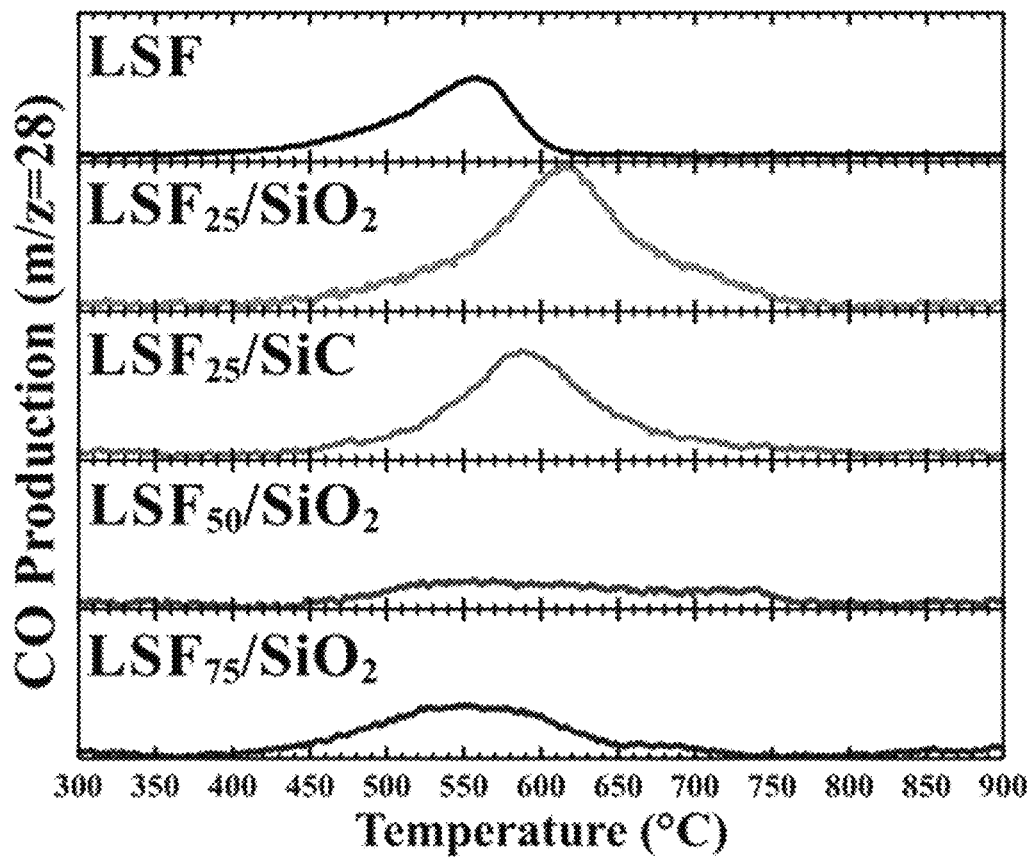
FIG. 3B the temperature-programmed experimental data for CO. $TPO-CO_2$ reveals the changes in CO production with each support and mass ratio.
Figure 3C:
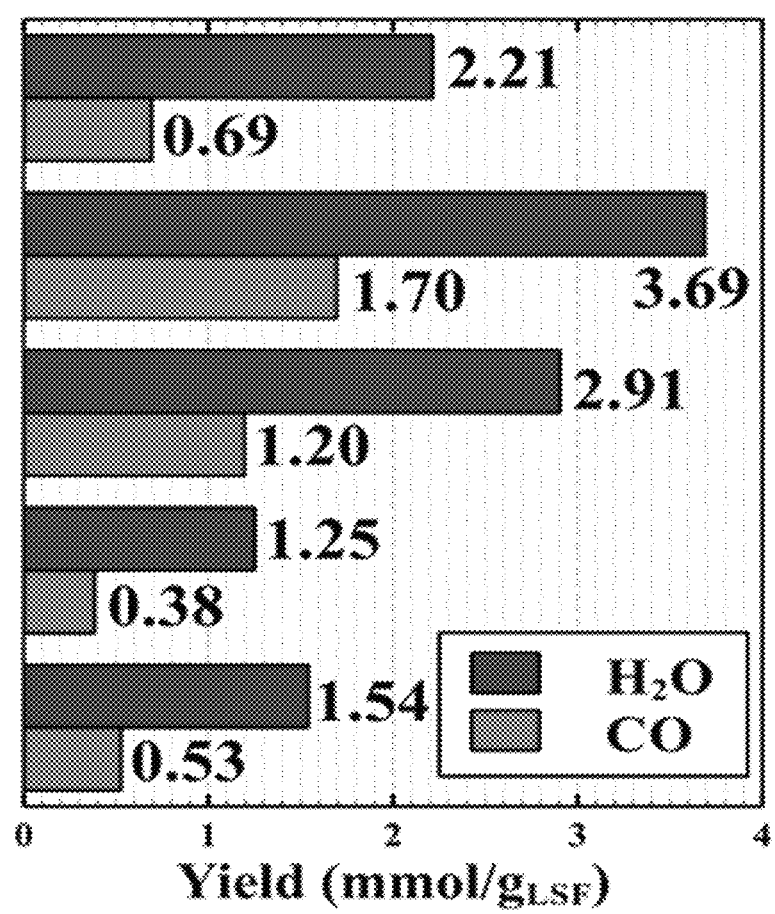
FIG. 3C shows the temperature-programmed quantifications for $H_2O$ and CO.

Successful RWGS-CL is contingent on generation of oxygen vacant active sites throughout the perovskite surface and bulk during the reduction step. These active sites are then repurposed for CO2 to CO conversion in the subsequent oxidation step. Under H2 flow and increasing temperature, H2O formation indicated the generation of oxygen vacancies by removal of oxygen installed in the bulk and strongly adsorbed to the surface. Consecutive disintegration of the perovskite phase into simpler, unary and oxides was also observed. These reactions are depicted in FIG. 3A by H2O formation (m/z=18) below 700° C. and over 750° C., respectively. The LSF-based composites exhibited higher peak temperatures, about 600° C., for $H_2O$ formation than that of LSF (550° C.) alone. This phenomenon may be related to formation of cationic vacancies during the sintering of LSF and $SiO_2$. A previous study delineated the increase in oxygen vacancy formation energy as the extent of vacancies in the lattice increases. Therefore, the slight but permanent removal of Fe and La from the perovskite lattice resulted in the formation of $FeSiO_3$ and $La_2SiO_5$ respectively along with the shift in the perovskite reduction temperature. Sustainable chemical looping with perovskite-oxides required the formation of oxygen deficient phases without decomposition to disparate species. The TPR profiles suggested 600° C. was an adequate temperature for achieving numerous vacancies prior to $CO_2$ conversion while retaining material intactness. CO formation was indicated by the m/z=28 peak as displayed in FIG. 3B. Complementary to TPR experiments, CO generated over the LSF composites at about 50° C. higher than over pure LSF. Quantifications in FIG. 3C showed that $H_2O$ production surpassed that of CO due to a few crucial factors. The entirety of perovskite surface oxygen, for instance, contributed to immense $H_2O$ formation during first-time reduction. Yet replenishment remained highly implausible due to the gradual buildup of kinetic stagnation during $CO_2$ conversion. Moreover, the activity of oxygen vacant sites towards CO formation was closely related to the net number of oxygen vacancies present at any time. $CO_2$ adsorption strength over a perovskite-oxide increased with the extent of surface oxygen vacancies, reflecting higher probability of conversion. Thus, with progressive refilling of oxygen vacant sites via $CO_2$ to CO conversion came a gradual stagnation of surface exchange kinetics which resulted in less CO production than that of $H_2O$ in the first cycle.

Capacities of 2.21 mmol $H_2O$ $g_{LSF}^{-1}$ and 0.69 mmol CO $g_{LSF}^{-1}$ were produced during the control experiment with unsupported LSF. While utilization of $SiO_2$ as a supporting material with 25% LSF resulted in a 67% increase in $H_2O$ formation capacity at 3.69 mmol $g_{LSF}^{-1}$, CO production experienced a greater magnitude of improvement of 150% for a total yield of 1.70 mmol $g_{LSF}^{-1}$. $LSF_{25}$/SiC also exhibited improved $H_2O$ (2.91 mmol $g_{LSF}^{-1}$) and CO (1.20 mmol $g_{LSF}^{-1}$) formation. The XRD patterns of LSF:$SiO_2$ amalgams after the experiment showed the presence of pure orthorhombic LSF and hexagonal $SiO_2$ phases along with minor concentrations of secondary phases of $FeSiO_3$ and $La_2SiO_5$. Density functional theory (DFT) based calculations revealed that the LSF phase was the most favorable substrate to accommodate oxygen vacancies while all other phases ($SiO_2$, $FeSiO_3$ and $La_2SiO_5$) demanded a higher energy input to create oxygen vacancies (FIG. 4A). $CO_2$ conversion results for $LSF_{25}$/SiC validated this hypothesis, for this composite demonstrated enhanced $H_2O$ and CO formation without consisting of $SiO_2$ or secondary phases. Thus, the reason for better $CO_2$ conversion was attributed to more surface area of LSF exposed for gas interactions. This was corroborated by the decreased crystallite size of LSF in the composites compared to its pure phase catalyst.

Moreover, the increased cell volume of the LSF perovskite indicated the presence of a strained perovskite structure. As shown in FIG. 4B, an expanded crystal lattice enabled oxygen vacancy formation in LSF. Thus, these strained interfaces, suggested by cell volume calculations in Table 1, were found to promote oxygen vacancy creation and subsequently enhance $CO_2$ conversion. $SiO_2$ showed greater promise than SiC, as it manifested a wettability effect on the perovskite particles. Silica was previously shown to demonstrate affinity for transition metals and was capable of both reducing particle sizes and contact angles. However, there existed an optimum LSF:$SiO_2$ ratio as was evident from FIG. 3C whereby $LSF_{50}$/$SiO_2$ and $LSF_{75}$/$SiO_2$ showed poor $CO_2$ conversion performance. This was associated with increased formation of $FeSiO_3$ and $La_2SiO_5$ at the LSF:$SiO_2$ interface. These secondary phases acted as catalyst poisons, reducing the composites' ability to accommodate oxygen vacancies and CO generation capacity. As aforementioned, they were also believed to be the underlying cause of an increase in $E_{vac}$ due to additional cationic vacancies, and therefore the reduction temperature observed in the TPR experiments. $LSF_{25}$/$SiO_2$ however, simultaneously demonstrated minimal secondary phase formation and maximum wettability making the material a suitable candidate for chemical looping.

Example 4. Sustained Performance in RWGS-CL

Figure 5:
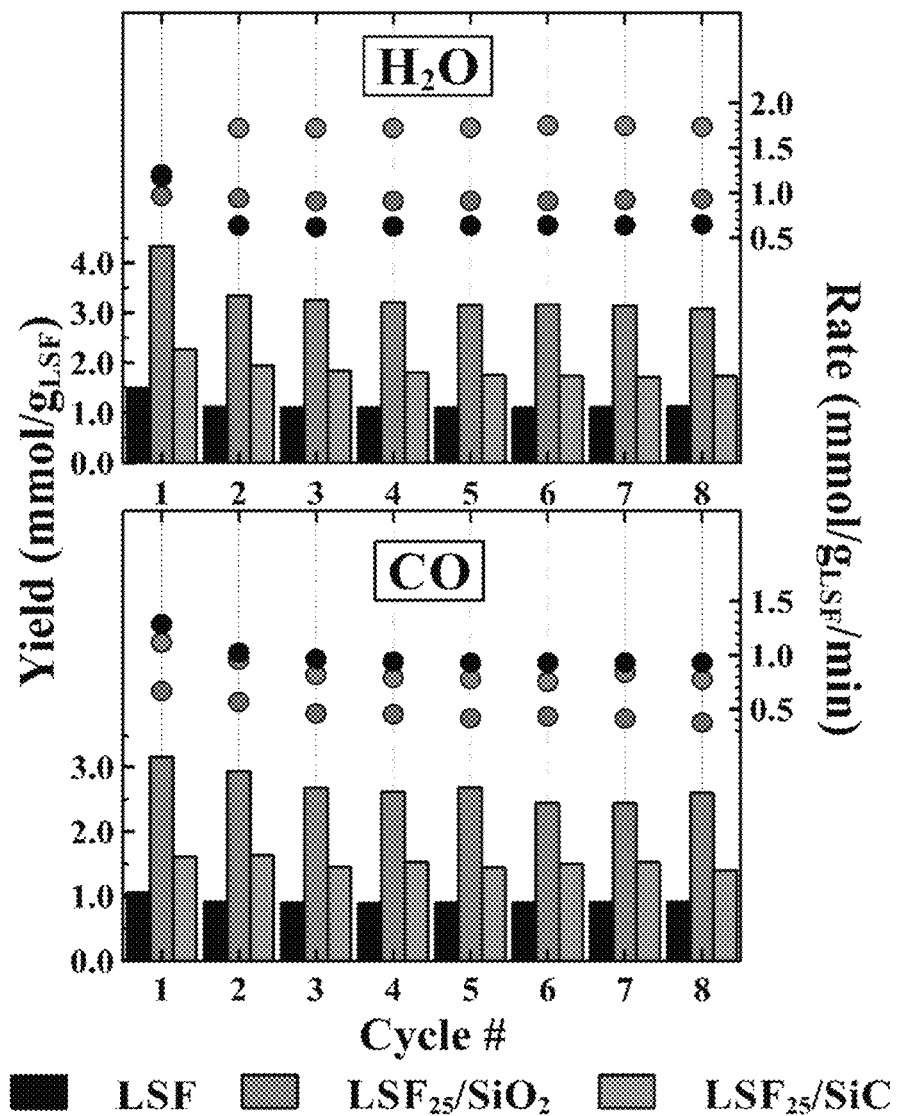
FIG. 5 shows RWGS-CL experiment results for LSF, $LSF_{25}/SiO_2$, and $LSF_{25}/SiC$ over eight cycles at 600° C. The top graph shows $H_2O$ production yields and peak rates. The bottom graph shows CO production yields and peak rates.

The stability and activity of the materials were demonstrated across eight consecutive RWGS-CL cycles (FIG. 5). $LSF_{25}$/$SiO_2$ achieved the highest $H_2O$ and CO yields per perovskite mass basis. By the concluding cycle, the results for $LSF_{25}$/$SiO_2$ settled at about 3.10 mmol $H_2O$ $g_{LSF}^{-1}$ per cycle and 2.60 mmol CO $g_{LSF}^{-1}$ per cycle. Overall, $LSF_{25}$/$SiO_2$ exhibited 8% and 12% decreases in $H_2O$ and CO production, respectively, after 8 cycles. Unsupported LSF showed no decrease in $H_2O$ production, $H_2O$ production stabilized at about 1.10 mmol $H_2O$ $g_{LSF}^{-1}$, or CO production, which remained steady around 0.90 mmol CO $g_{LSF}^{-1}$. $LSF_{25}$/SiC demonstrated better performance than pure LSF but fell short of $LSF_{25}$/$SiO_2$. The extent of oxygen vacancy formation, $\delta$ (in $ABO_{3-\delta}$), for LSF was calculated to be 0.26. Those of $LSF_{25}$/$SiO_2$ and $LSF_{25}$/SiC were 0.72 and 0.40 respectively. The CO production rate for pure LSF stabilized over time at 0.93 mmol CO $g_{LSF}^{-1}$ $min^{-1}$ in comparison to 0.80 and 0.38 for $LSF_{25}$/$SiO_2$ and LSF/SiC respectively, restrictions potentially imputed to transport limitations exhibited by the supports. Rates were estimated also on an approximated perovskite-oxide surface area basis (Table 2). In this metric, the $LSF_{25}$/$SiO_2$ composite surpassed the rate of LSF alone and this was consistent with changes in exposed facets and/or strain that would enhance vacancy formation at the surface.

Figure 6A:
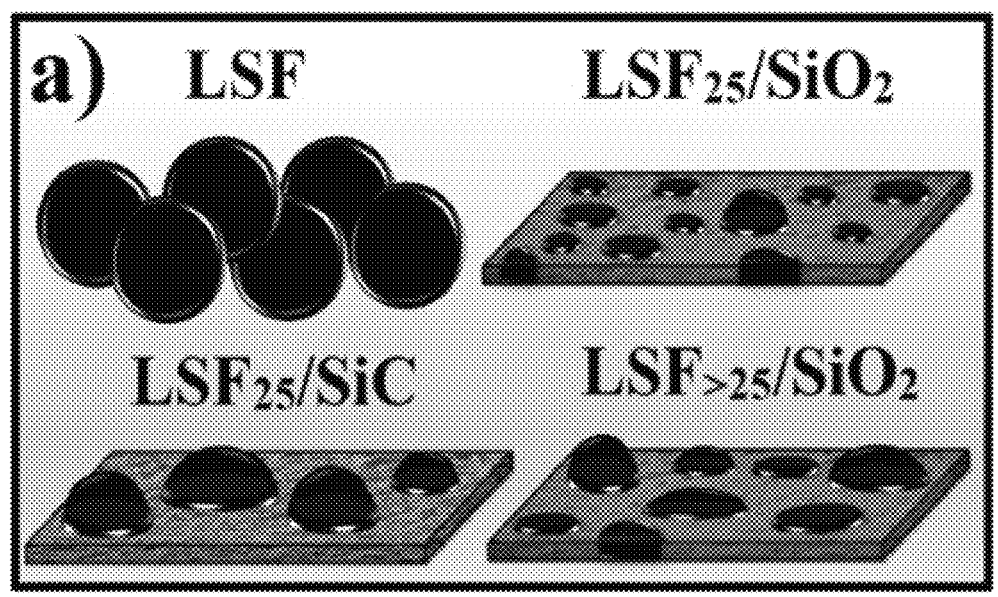
FIG. 6A shows a visual schematic of LSF particle size modification by supporting materials during RWGS-CL.
Figure 6B:
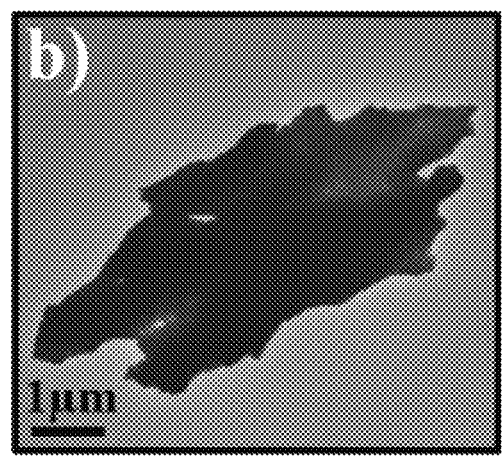
FIG. 6B shows a TEM image of LSF indicating particle size.
Figure 6C:
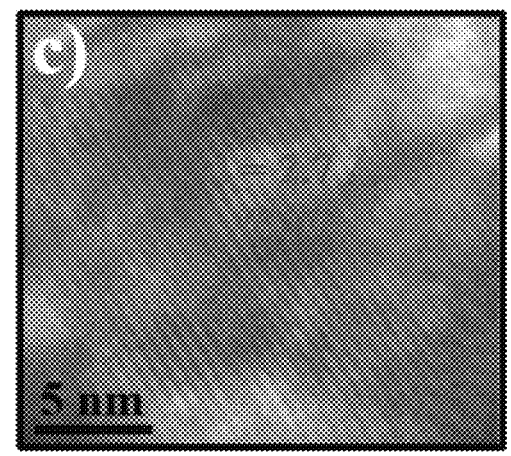
FIG. 6C shows a TEM image of LSF indicating interplanar spacing.
Figure 6D:
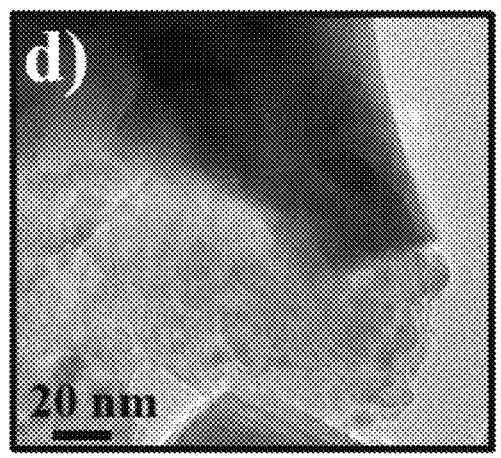
FIG. 6D shows a TEM image of Fresh $LSF_{25}/SiO_2$ interface.
Figure 6E:
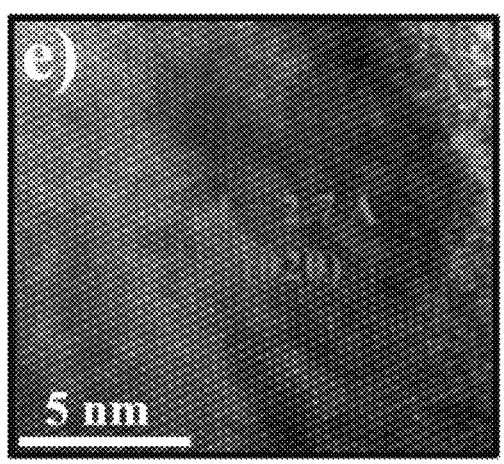
FIG. 6E shows a TEM image of Fresh $LSF_{25}/SiO_2$ interplanar spacing.
Figure 6F:
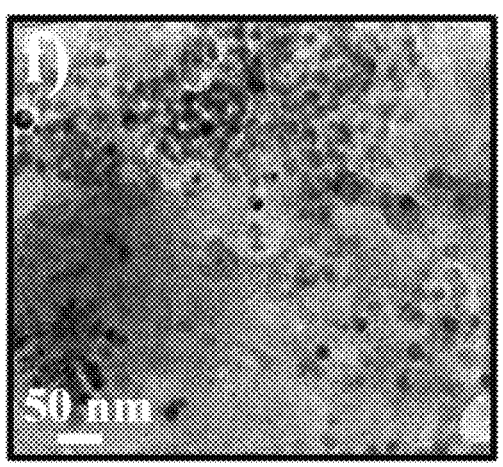
FIG. 6F shows a TEM image of $LSF_{25}/SiO_2$ after 8 RWGS-CL cycles illustrating a significant decrease in LSF particle size and formation of nanoparticles.
Figure 6G:
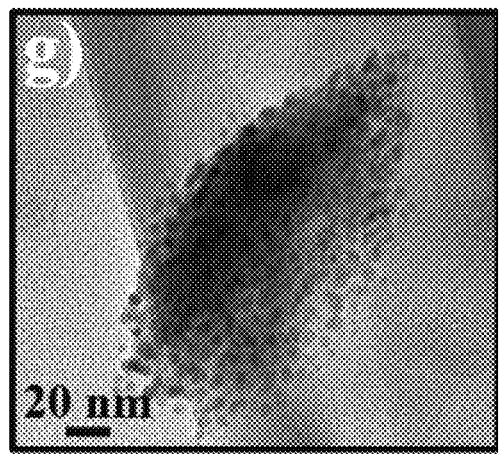
FIG. 6G shows a TEM image of $LSF_{25}/SiO_2$ after 8 RWGS-CL cycles illustrating a significant decrease in LSF particle size and formation of nanoparticles.
Figure 6H:
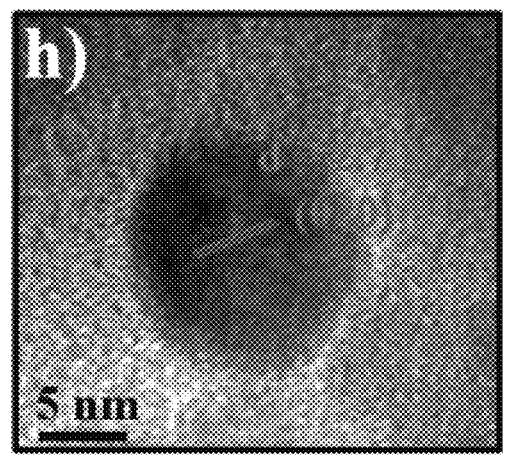
FIG. 6H shows a TEM image of $LSF_{25}/SiO_2$ after 8 RWGS-CL cycles illustrating a significant decrease in LSF particle size and formation of nanoparticles.

Perhaps the greatest significance of the chemical looping data was attributed to the escalation in the $H_2O$ production rate using $SiO_2$. As aforementioned, accelerated oxygen vacancy formation was concomitant with smaller average perovskite particle radii. It was also possible that water spillover to the silica support enabled faster reduction rates, but this effect was anticipated to be minimal in comparison due to the limited water adsorption at these elevated temperatures. Crystallite size reduction, resulting in increased surface area of LSF, was established to be the primary governing criteria for enhanced $CO_2$ conversion by supported perovskites. Although the average crystallite size of unsupported LSF remained unchanged throughout the 8 cycles, those of the supported samples decreased (Table 2). More in particular, LSF supported on $SiO_2$ resulted in a 55% decrease in crystallite size and complimented the loss of bulk oxygen during the course of particle separation. This notable change was illustrated and confirmed by transmission electron microscopy (TEM; FIGS. 6B-H). While the size of fresh LSF particles, unsupported and supported, remained in the micron threshold, small clusters of LSF nanoparticles formed during RWGS-CL. These nanoparticles were essentially a source of active sites for oxygen vacancy formation and $CO_2$ conversion. These nanoparticles were not seen to consist of any metallic (Fe, Sr or La) phases nor were they comprised of any binary oxides (Fe oxides, Sr oxides and La oxides). As was evident from FIG. 6H, the high-resolution image of the nanoparticle structure revealed the (020) crystal facet that matched that of the fresh samples (FIG. 6C) and post reaction samples (FIG. 6E). Strong interaction between LSF nanoparticles and silica rafts restricted their growth and agglomeration, thereby ensuring a surfeit of active sites for $CO_2$ conversion.

Although silicon carbide demonstrated the same effect according to the Scherrer analysis, it was assured that the particle size reduction magnitude remained much greater when utilizing silica to support perovskite-oxides. Because the black silicon carbide was not reduced, but rather pre-treated at 1000° C. in air, there was expected to be a notable presence of oxygen due to a partially oxidized surface and iron oxide impurities. Interactions between a support and active phase are much stronger when using a bulk oxide as opposed to an inert support consisting of a few surface oxide layers. Perovskite segregation likely occurred during the second reduction step when surface oxygen was previously removed and the increase in $H_2O$ was noted. The high presence of metallic B-site metals on the perovskite surface during reduction was perhaps the driving force for particle size reduction on silica due to the spontaneity of metals to diffuse into the top layers of the oxide bulk. The kinetic inclination of these ions perhaps pulled apart the large particles to form nanoparticles. This phenomenon was accompanied by the strong surface energy of the reduced perovskite, i.e., oxygen vacant perovskites show strong affinity for species with high oxygen content, such as $CO_2$ or even potentially $SiO_2$ regardless of its inert behavior. This surface behavior was not observed in the post TPO-$CO_2$ samples where $CO_2$ flows over these samples up to 950° C. It was thus evident that perovskite particle aggregation was inevitable at high temperatures during synthesis and other STC processes, but may be reversed by subjection to the RWGS-CL process in the presence of appropriate supports at low thermochemical temperatures.

RWGS-CL was capable of converting $CO_2$ to CO at a low temperature of 600° C. with unprecedented rates using the $La_{0.75}Sr_{0.25}FeO_3$ (LSF) perovskite-type oxide supported on silica. The LSF-silica composite (25% LSF by mass) promoted a greater extent of oxygen vacancies, a key parameter for $CO_2$ conversion. Throughout eight cycles of RWGS-CL, CO generation yields of LSF on silica surpassed those of LSF alone by about 200%, producing 0.8 mmol CO/gLSF/min. Average LSF crystalline size in the composite decreased by 55% over eight cycles of chemical looping. This phenomenon may be attributed to wettability by silica and controlled quantities of secondary phases formed during high temperature sintering.

Example 5. Temperature-Programmed Experiments

Figure 7:
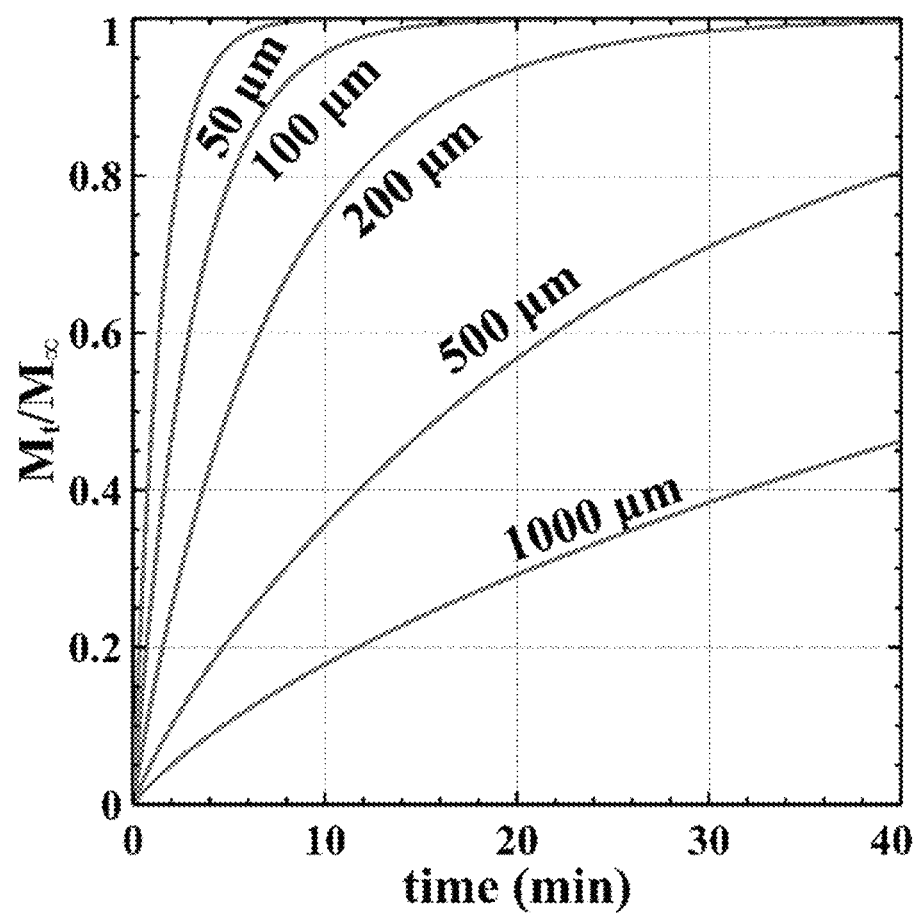
FIG. 7 shows the change in nonstoichiometric LSF mass over time with different particle sizes. The time required for vacancies to replenish decreases with particle size as calculated by Equation 1 (D=$2 \times 10^{-7}$ $cm^2/s$).

As opposed to using bulk single-phase catalyst pellets, the inclusion of supporting material was necessary to improve perovskite surface area and accelerate oxygen self-diffusion. The speed at which oxygen is exchanged by nonstoichiometric oxides may be modeled with the one-dimensional equation $$\frac{M_t}{M_\infty} = 1 - \sum_{n=1}^{\infty} \frac{2L^2 \exp\left(-\frac{b_n^2 Dt}{l^2}\right)}{b_n^2(b_n^2 + L^2 + L)} \quad (1)$$

where $M_t$ is the sample mass at time t, $M_\infty$ is the sample mass at the experiment conclusion and l is the radius. D represents the effective diffusivity of the oxygen vacancy which in this case will depend on the perovskite metallic composition and a thermodynamic proportionality factor. An effective diffusivity coefficient (D) of $2 \times 10^{-7}$ cm$^2$/s was obtained for LSF at 600° C. through the interpolation of data obtained by Armstrong et al (E. N. Armstrong, K. L. Duncan, E. D. Wachsman, Effect of A and B-site cations on surface exchange coefficient for $ABO_3$ perovskite materials, Phys. Chem. Chem. Phys., 15 (2013) 2298-2308). L is the dimensionless ratio 1 k/D where k is the surface exchange coefficient, given as $10^{-5}$ cm/s. $b_n$ is the $n^{th}$ positive root of b*tan(b)=L [38]. This phenomenon, illustrated in FIG. 7 with LSF, foreshadowed low CO yields and long cycle times if pellets were designed without supporting material able to maintain a high surface to volume ratio for the perovskite phase.

Figure 8:
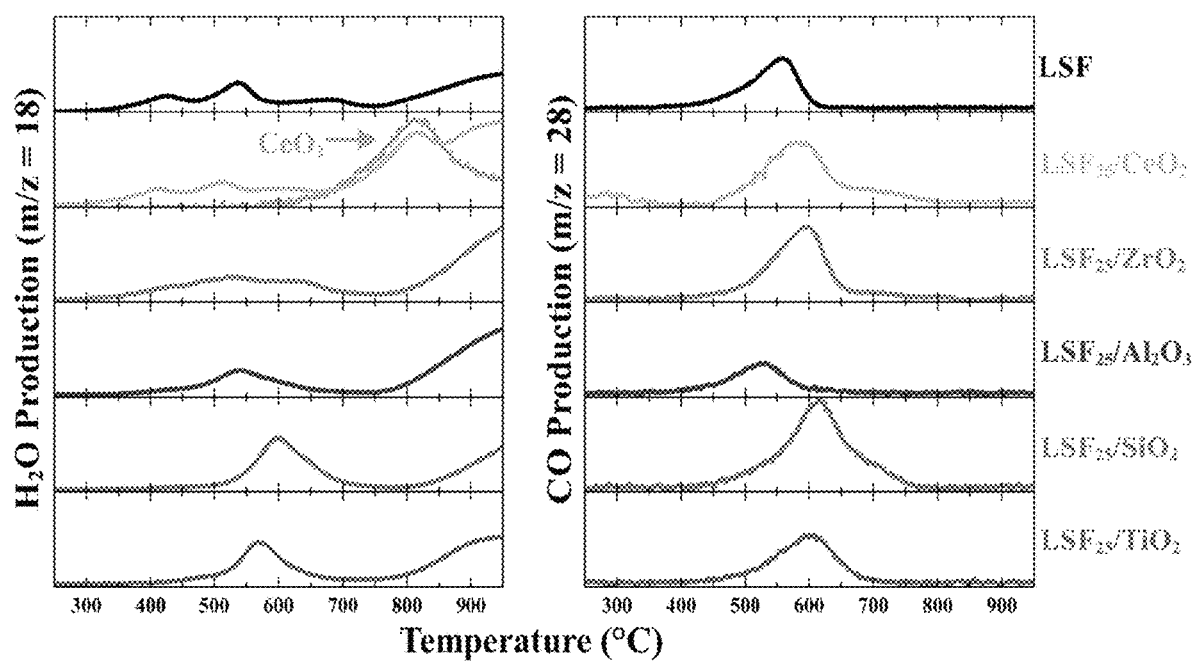
FIG. 8 shows the results from temperature-programmed reductions with $H_2$ (left panel) and temperature-programmed oxidations with $CO_2$ for LSF and affiliated composites (right panel).
Figure 9A:
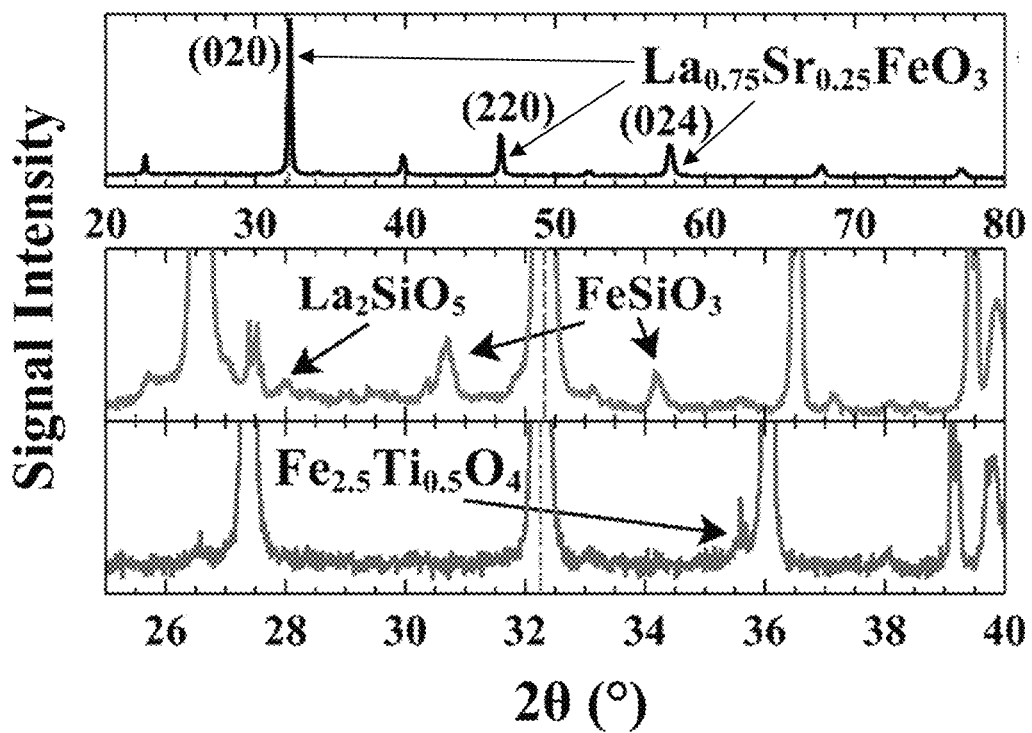
FIG. 9A shows diffraction patterns of LSF and a close inspection of identified secondary phases witnessed in fresh $LSF_{25}/SiO_2$ (red, top) and post $TPO-CO_2$ $LSF_{25}/TiO_2$ (green, bottom).
Figure 9B:
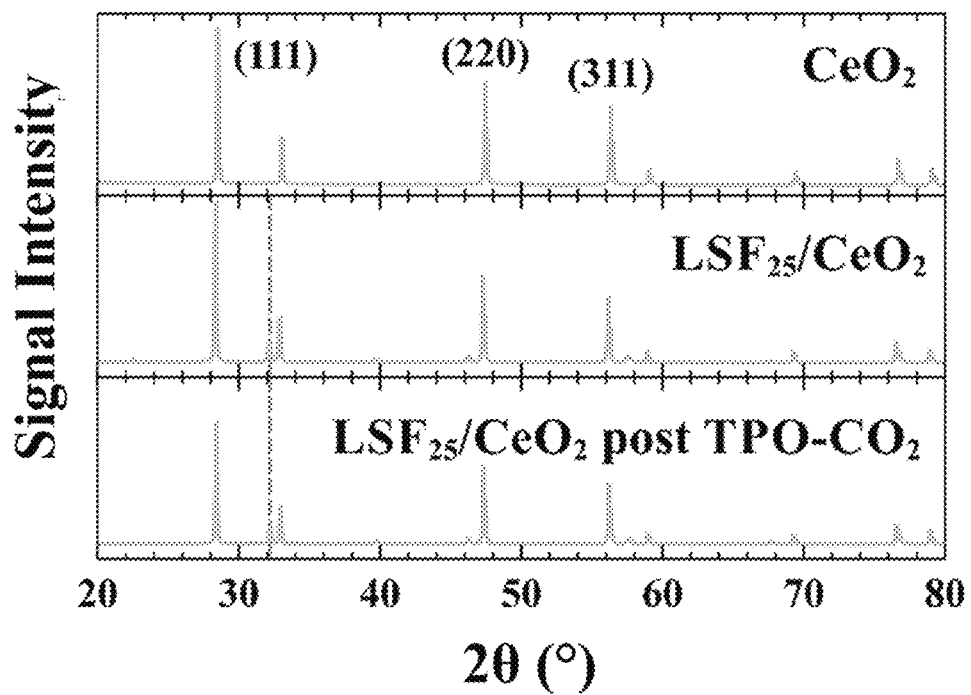
FIG. 9B shows post heat treatment at 950° C. and post $TPO-CO_2$ diffraction patterns of $LSF_{25}/CeO_2$, demonstrating structural stability throughout material lifetime.
Figure 9C:
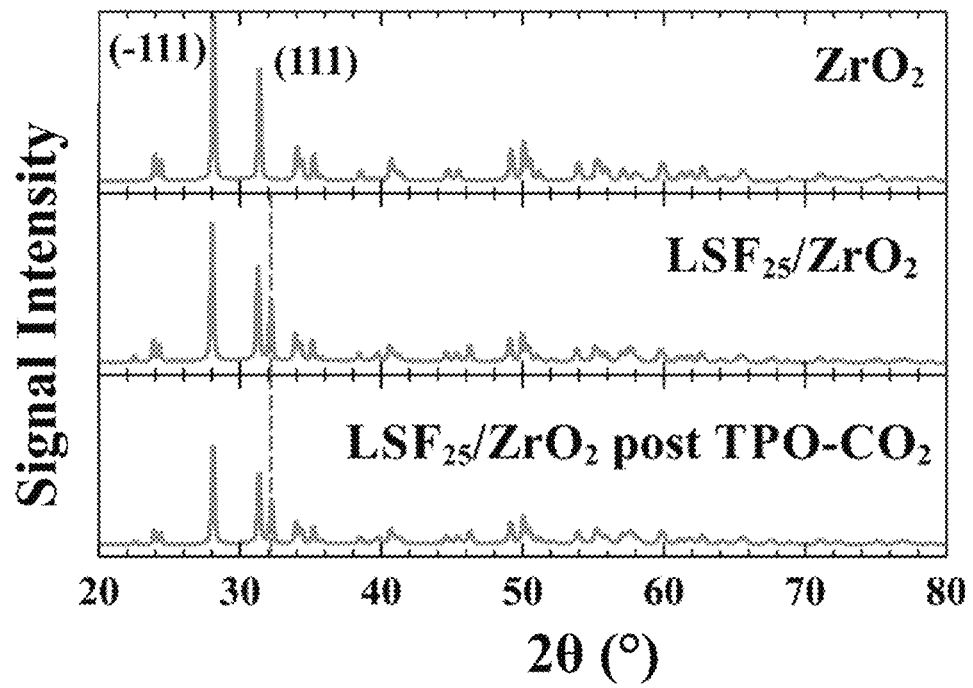
FIG. 9C shows post heat treatment at 950° C. and post $TPO-CO_2$ diffraction patterns of $LSF_{25}/ZrO_2$, demonstrating structural stability throughout material lifetime.
Figure 9D:
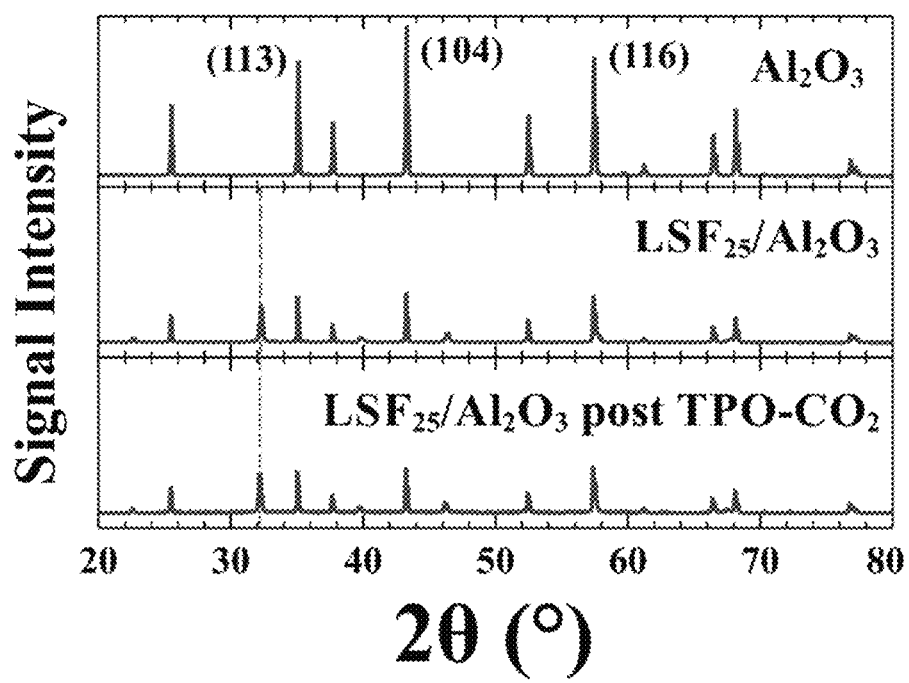
FIG. 9D shows post heat treatment at 950° C. and post $TPO-CO_2$ diffraction patterns of $LSF_{25}/Al_2O_3$ (with corundum), demonstrating structural stability throughout material lifetime.
Figure 9E:
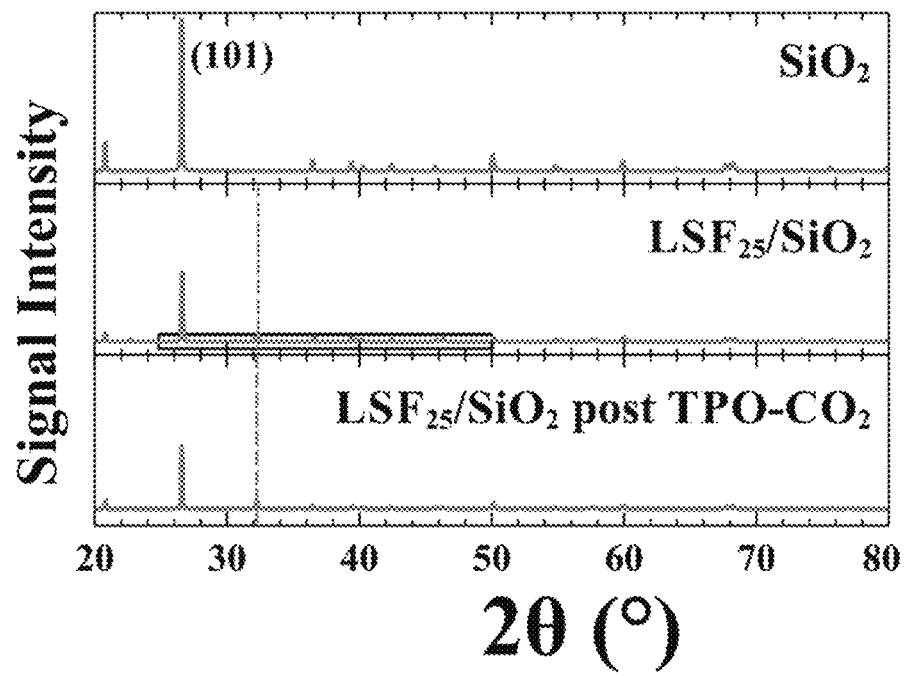
FIG. 9E shows post heat treatment at 950° C. and post $TPO-CO_2$ diffraction patterns of $LSF_{25}/SiO_2$ (with quartz), demonstrating structural stability throughout material lifetime.
Figure 9F:
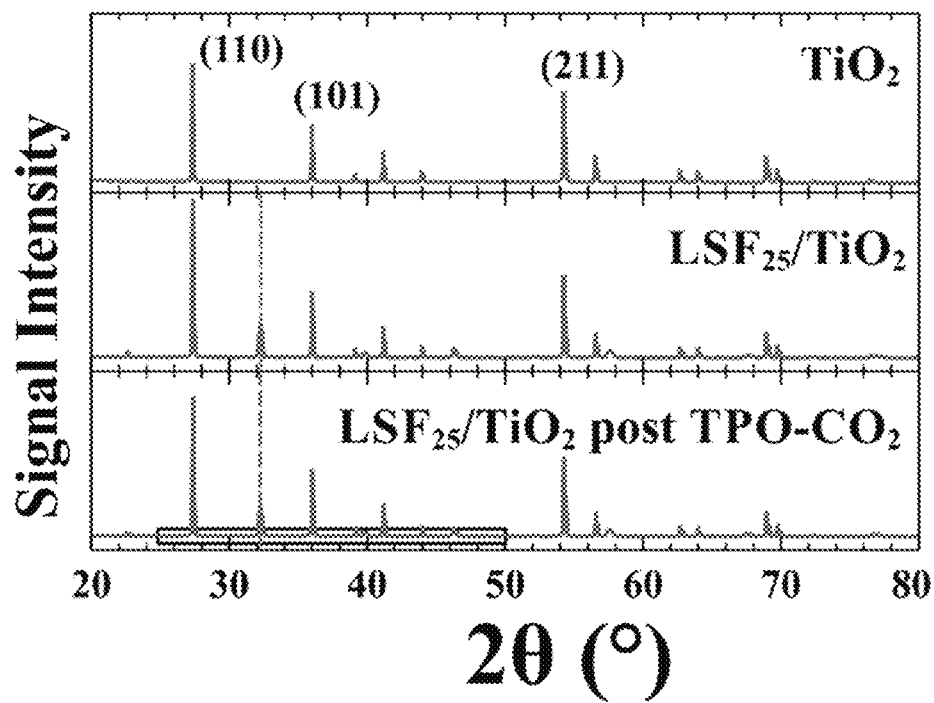
FIG. 9F shows post heat treatment at 950° C. and post $TPO-CO_2$ diffraction patterns of $LSF_{25}/TiO_2$ (with rutile), demonstrating structural stability throughout material lifetime.
Figure 12:
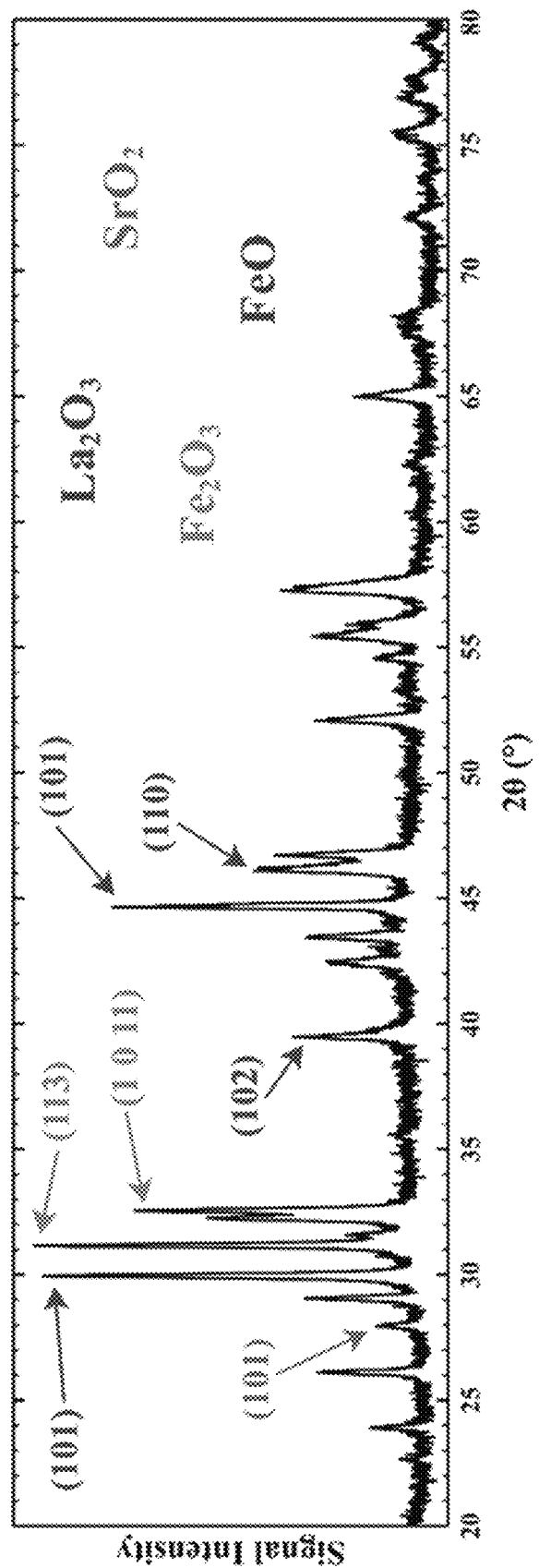
FIG. 12 shows the X-ray diffraction pattern for LSF post-TPR (10% v/v $H_2$ in He up to 950° C.). Major diffraction lines are identified as $La_2O_3$ (blue), $SrO_2$ (green), $Fe_2O_3$ (red), and FeO (dark red).

Each composite and LSF individually was subjected to TPR and TPO-$CO_2$ experiments to identify conversion temperatures and quantify $H_2O$ and $CO_2$ yields. TPR results (FIG. 8) suggested oxygen vacancy formation occurred, an important step in initiating the RWGS-CL process. Signal elevation below 700° C. was interpreted as partial reduction of the perovskite phase ($ABO_3$ to $ABO_{3-\delta}$) while that above 800° C. was confirmed to be decomposition of the perovskite into binary oxides such as FeO (FIG. 12). Thus, TPR profiles suggested 600° C. is an adequate temperature for creating vacancies and thus active sites for $CO_2$ conversion. CO production temperatures following isothermal reduction at 600° C. (FIG. 8) undoubtedly complimented those of their respective TPRs, suggesting each of the materials are suitable for RWGS-CL.

Total $H_2O$ and CO yields (Table 3) were obtained from numerical integration. Most notably, $LSF_{25}/SiO_2$ resulted in the highest $H_2O$ and CO yields of 3690 and 1700 $\mu mol/g_{LSF}$ respectively. This significant 150% increase in CO production by $LSF_{25}/SiO_2$ even surpassed those of $LSF_{25}/CeO_2$ and $LSF_{25}/ZrO_2$. Due to the similarity between LSF and $LSF_{25}/CeO_2$ TPR profiles below 600° C. along with the $CeO_2$ reduction peak witnessed at about 800° C., it was highly unlikely that this support participated in the reactions. This catalytic hindering may be alleviated by using higher redox temperatures, which contradicts the incentives for feasible $CO_2$ utilization due to a higher energy input. While $TiO_2$ appeared to have no consequential effect on the reaction, the use of $Al_2O_3$ was evidently detrimental to the redox properties of LSF given the 29% decrease in CO production. Nonetheless, $LSF_{25}/SiO_2$ remained the top composite candidate for perovskite-based syngas production.

TABLE 3

Quantified TPR and TPO-$CO_2$ results.

| Sample | $H_2O$ yield ($\mu mol/g_{LSF}$) | yield ($\mu mol/g_{LSF}$) |
|---|---|---|
| LSF | 2210 | 690 |
| $LSF_{25}/CeO_2$ | 1720 | 1100 |
| $LSF_{25}/ZrO_2$ | 2040 | 1350 |
| $LSF_{25}/Al_2O_3$ | 2920 | 490 |
| $LSF_{25}/SiO_2$ | 3690 | 1700 |
| $LSF_{25}/TiO_2$ | 2180 | 850 |

Example 6. X-Ray Diffraction

Figure 13:
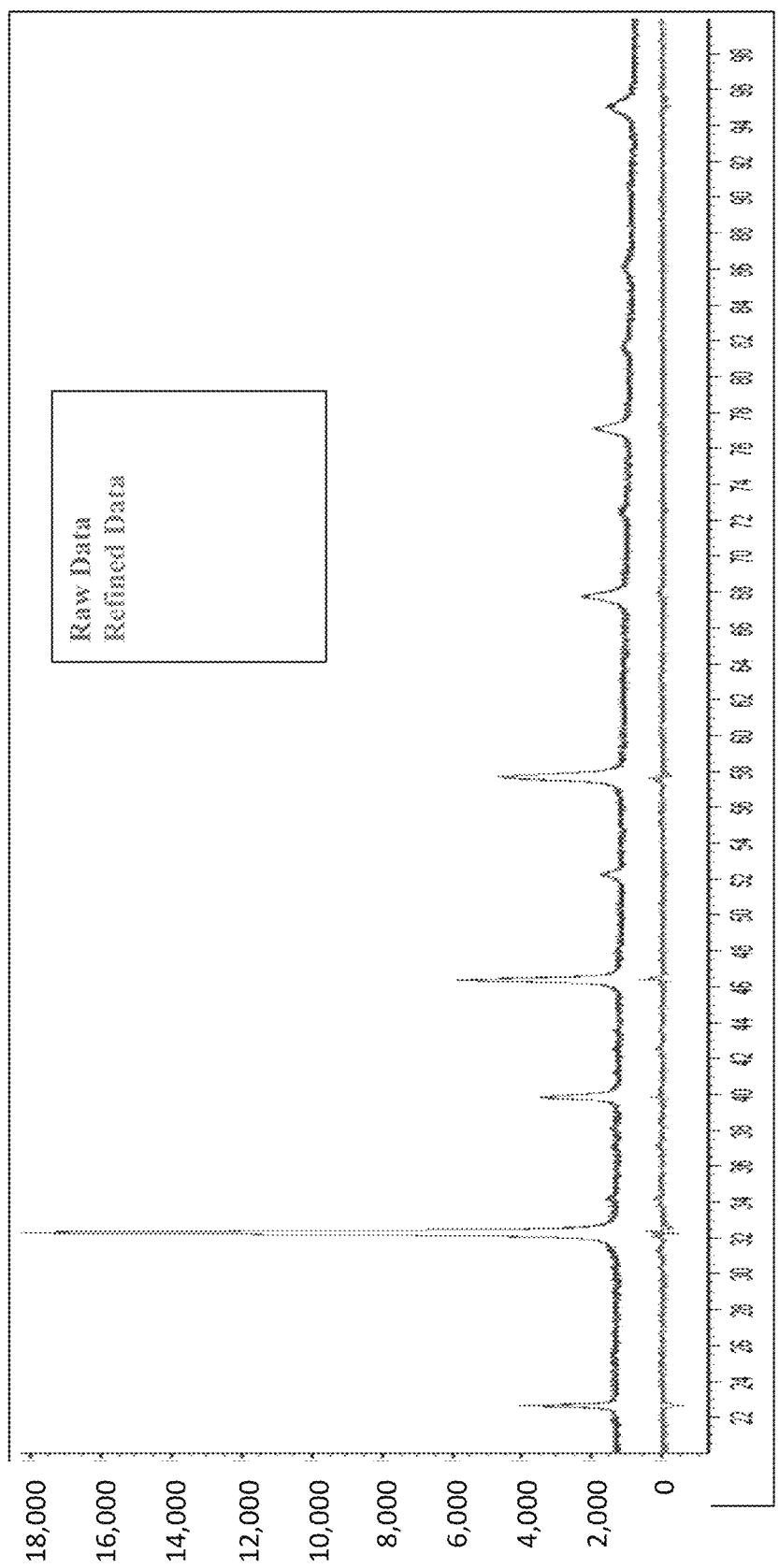
FIG. 13 shows the Rietveld refinement results for the LSF XRD pattern with a Rwp value of 3.7% and RBragg of 1.0%.

XRD patterns were examined for changes in crystalline phases and the presence of secondary phases due to solid state reactions between the perovskite and support. As illustrated in FIGS. 9A-F, the overall stability of orthorhombic LSF (Ref. Code 00-035-1480) on each support was assured while (020) remained the dominant perovskite facet throughout the sample lifetime from particle sintering to the conclusion of TPO-$CO_2$ experiments. Rietveld refinement of the LSF diffraction pattern resulted in an Rwp value of 3.7% and RBragg of 1.0% (FIG. 13 and Table 4). The crystal structures of $CeO_2$, $ZrO_2$, $Al_2O_3$, $SiO_2$, and $Al_2O_3$ were cubic, monolithic, hexagonal, hexagonal, and tetragonal, respectively.

Close examination revealed the minute presence of orthorhombic $FeSiO_3$ (Ref. Code 01-076-0886) and monoclinic $La_2SiO_5$ (Ref. Code 00-040-0234) at the LSF:$SiO_2$ interface following composite sintering at high temperatures. These phases had been witnessed before in iron oxide:silica composites yet were not expected to exercise notable presences as reflected by current difficulties in synthesizing bulk single-phase quantities of $FeSiO_3$. In addition, cubic $Fe_{2.5}Ti_{0.5}O_4$ (Ref. Code 00-051-1587) was detected at 35.6 2θ as a result from solid state reactions during either the reduction or oxidation of LSF. These phases did not initially appear detrimental to the catalytic activity but may pose consequences of interest during the manufacturing of large-scale pellets and monoliths.

TABLE 4

Occupancy and atomic coordinates used for LSF Rietveld refinement

| Site | Np (# of phases) | $x^\alpha$ | $y^\alpha$ | $z^\alpha$ | Occupancy parameter | Isotropic thermal parameter ($b_{eq}$) |
|---|---|---|---|---|---|---|
| La | 4 | 0.48790 | 0.25000 | 0.00360 | 0.75 | 1.15 (3) |
| Sr | 4 | 0.48790 | 0.25000 | 0.00360 | 0.25 | 1.15 (3) |
| Fe | 4 | 0.00000 | 0.00000 | 0.00000 | 1 | 0.70 (4) |
| O2 | 8 | 0.23880 | 0.03560 | 0.27390 | 1 | 1 |
| O1 | 4 | 0.49840 | 0.25000 | 0.56530 | 1 | 1 |

$^a$Obtained from Dann et al. J. Solid State Chem. 1994

By utilizing the geometrical characteristics of the (020) diffraction line, LSF crystallite size was estimated before and after 8 cycles of RWGS-CL through a Scherrer analysis (Table 5). These values demonstrated the effect of each support on perovskite particles. By utilizing silica, the average LSF crystallite size decreased by 21% as opposed to an increase with every other support. These results complimented the expected increase in catalytic performance predicted with Equation 1. Although the majority of the supports resulted in further sintering of the perovskite particles, they each induced strain on the perovskite lattice and enlarged the LSF cell volume. This slight expansion of interplanar distance between atoms decreased oxygen vacancy formation energy, making it easier for more oxygen to desorb from the lattice.

Figure 14:
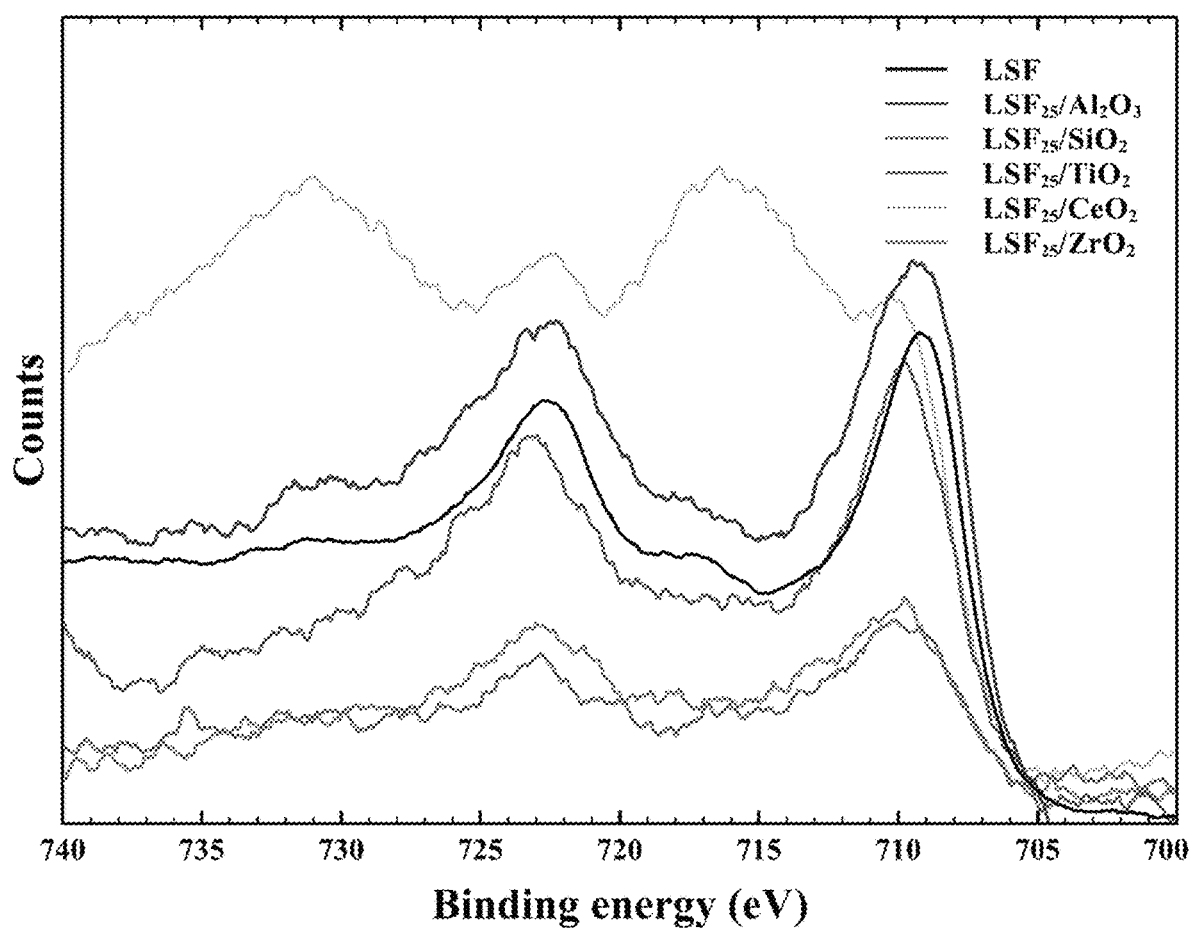
FIG. 14 shows the X-ray photoelectron spectrometry (XPS) spectra of LSF and all supported samples following 8 cycles of reverse water-gas shift chemical looping at 600° C.

X-ray photoelectron spectra (FIG. 14) were obtained for the LSF control and all supported samples following 8 cycles of reverse water-gas shift chemical looping at 600° C. The spectra each consisted of two major orbital peaks: $Fe2p_{1/2}$ at ~723 eV and $Fe2p_{3/2}$ at ~710 eV. The Fe (III) $Fe2p_{1/2}$~731 and Fe (II) $Fe2p_{3/2}$~717 eV satellite peaks are unique to the distinct oxidation states of Fe and suggested that the perovskite surface in $LSF_{25}/CeO_2$ has a relatively even mix of $Fe^{3+}$ and $Fe^{2+}$, that the oxide support did not pose a significant effect on the $Fe^{3+}/Fe^{2+}$ surface content ratio. The same conclusion can likely be made for perovskite surfaces in the other composites.

Example 7. DFT-Based Oxygen Vacancy Formation Energies

Oxygen vacancy formation energies ($E_{vac}$) serve as descriptors for the ability of an oxide material to convert $CO_2$. If a material exhibited a high $E_{vac}$, it would be unwilling to form vacancies, and therefore $CO_2$ conversion active sites, at low RWGS-CL operating temperatures. On the other hand, a low $E_{vac}$ would encourage numerous vacancies that were unlikely to be replenished in an oxidation reaction. With an $E_{vac}$ of about 3.4 eV, calculated with Equation 2, LSF resided in the optimal regime for notable catalytic activity. Each of the supporting materials however, including $CeO_2$, possessed $E_{vac}$ values greater than 4.0 eV as shown in FIG. 10. These results suggested that each support remained inactive during TPO-$CO_2$ experiments and that the perovskite was the only phase to produce vacancies during reduction at 600° C. Given that popular redox materials such as $CeO_2$ and $ZrO_2$ themselves do not participate in the reaction, utilizing them in low temperature RWGS-CL would contradict the investigation for a more economically friendly and kinetically enhanced composite.

Secondary phases identified through XRD analysis shared unidentified roles in $CO_2$ conversion. FIG. 10 also includes DFT-calculated $E_{vac}$ values for $FeSiO_3$, $La_2SiO_5$, and $Fe_{2.5}Ti_{0.5}O_4$ to provide insight regarding their own abilities to form oxygen vacancies at the composite interface. In regards to $LSF_{25}/SiO_2$, $FeSiO_3$ possessed an $E_{vac}$ of about 5.3 eV while $La_2SiO_5$ resided in the much higher energy regime with an $E_{vac}$ of about 7.0 eV. Given that $CeO_2$, the oxide with the lowest $E_{vac}$ aside from LSF, did not form its own vacancies until about 700° C. in the TPR experiments, it remained highly improbable that these secondary phases were active participants at these experimental temperatures.

TABLE 5

LSF cell volume, secondary phases identified in perovskite composites, and crystallite size estimations.

| Sample | LSF orthohombic cell volume (Å$^3$) | Post-calcination secondary phases | Post-TPO-$CO_2$ secondary phases | Post-calcination LSF crystallite size (Å) $^a$ | Post-8 cycles RWGS-CL (600° C.) LSF crystallite size (Å) $^a$ |
|---|---|---|---|---|---|
| LSF | 237.9 | — | — | 370 | 351 |
| $LSF_{25}/CeO_2$ | 240.5 | — | — | 384 | 526 |
| $LSF_{25}/ZrO_2$ | 239.8 | — | — | 367 | 448 |
| $LSF_{25}/Al_2O_3$ | 238.7 | — | — | 367 | 475 |
| $LSF_{25}/SiO_2$ | 238.5 | $FeSiO_3$, $La_2SiO_5$ | $FeSiO_3$, $La_2SiO_5$ | 351 | 278 |
| $LSF_{25}/TiO_2$ | 239.6 | — | $Fe_{2.5}Ti_{0.5}O_4$ | 367 | 448 |

$^a$Calculated by Scherrer analysis of XRD data with a shape factor of 0.9

The same conclusion was reached for $Fe_{2.5}Ti_{0.5}O_4$ due to its relatively high $E_{vac}$ of about 6.0 eV.

Example 8. Microscopy

Detailed images of each composite following 8 cycles of RWGS-CL are arranged in FIGS. 11A-11J. TEM revealed a consistent interplanar spacing of 0.27 Å for the LSF (020) facet when combined with each support. Minor amounts of strain resulted at each perovskite:support site of contact due to both interfacial forces and cationic migration during solid state reactions at high temperatures. The interplanar spacings of the LSF (020) facet on $CeO_2$, $ZrO_2$, $Al_2O_3$, $SiO_2$, and $TiO_2$ were 2.86, 2.74, 2.74, 2.78, and 2.70 Å respectively. The repercussions of this expanded lattice included decreased oxygen vacancy formation energy by perovskites and increased cell volume in accordance with XRD data.

Figure 11A:
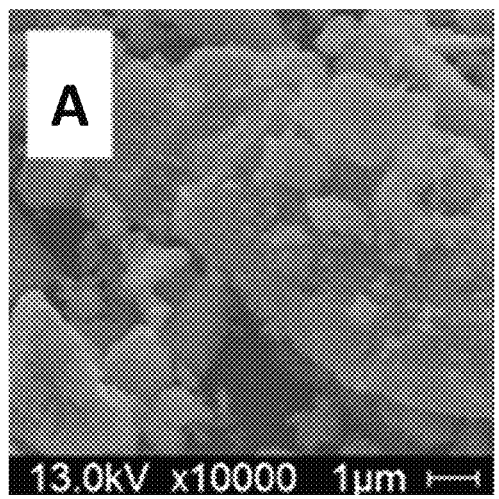
FIG. 11A shows an SEM image of $LSF_{25}/CeO_2$.
Figure 11B:
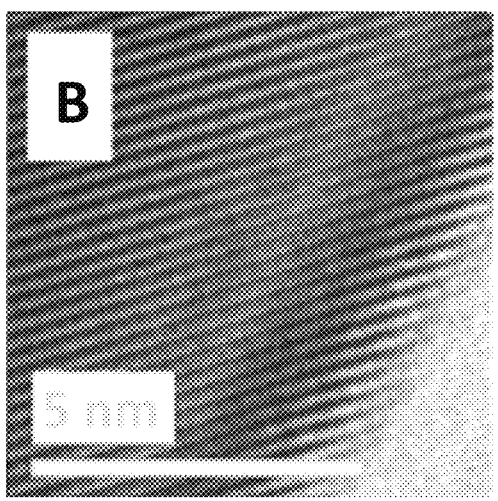
FIG. 11B shows a TEM image of $LSF_{25}/CeO_2$.
Figure 11C:
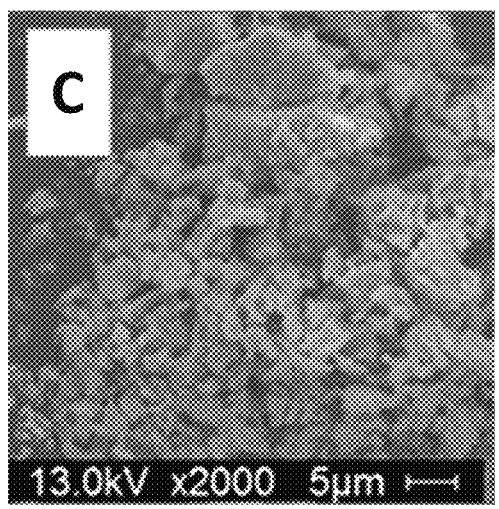
FIG. 11C shows an SEM image of $LSF_{25}/ZrO_2$.
Figure 11D:
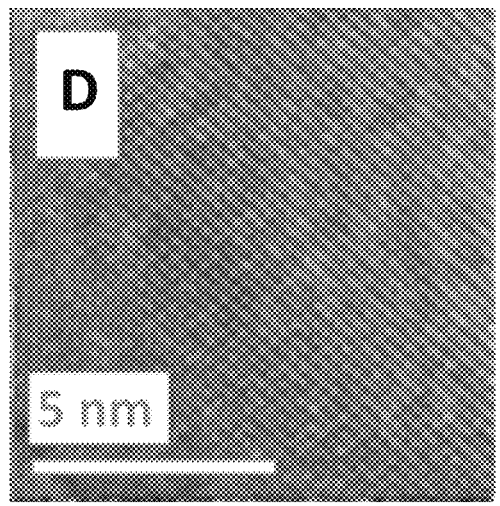
FIG. 11D shows a TEM image of $LSF_{25}/ZrO_2$.
Figure 11E:
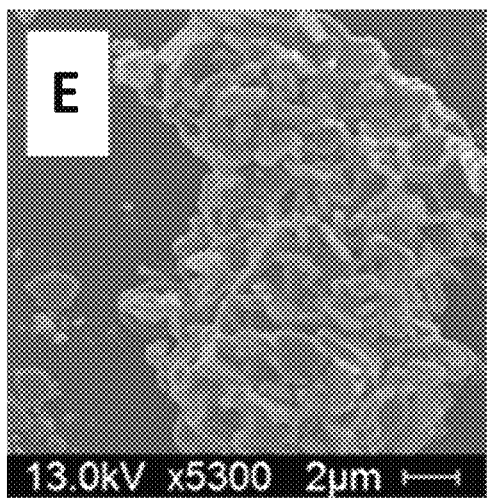
FIG. 11E shows an SEM image of $LSF_{25}/Al_2O_3$.
Figure 11F:
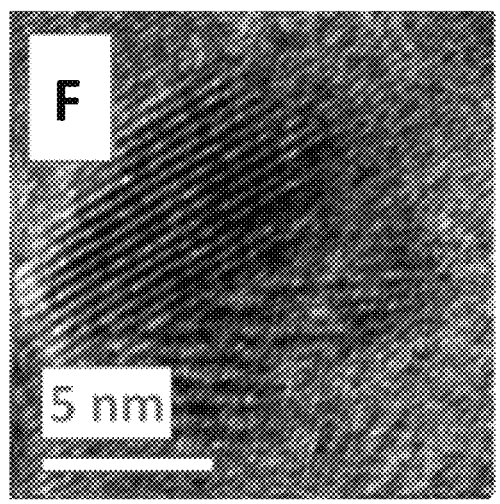
FIG. 11F shows an TEM image of $LSF_{25}/Al_2O_3$.
Figure 11G:
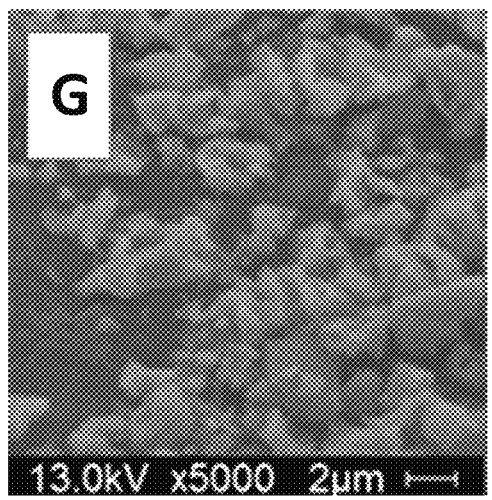
FIG. 11G shows an SEM image of $LSF_{25}/SiO_2$.
Figure 11H:
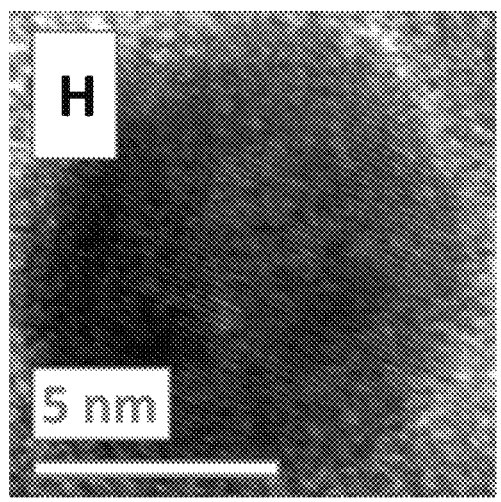
FIG. 11H shows a TEM image of $LSF_{25}/SiO_2$.
Figure 11I:
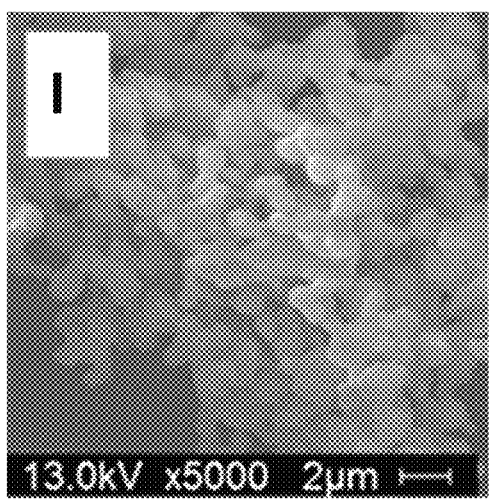
FIG. 11I shows an SEM image of $LSF_{25}/TiO_2$.
Figure 11J:
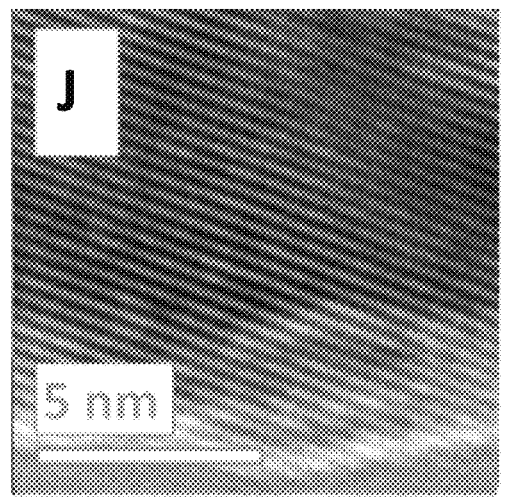
FIG. 11J shows a TEM image of $LSF_{25}/TiO_2$.

The SEM images however provided valuable insight to changes in $CO_2$ conversion by LSF. The $CeO_2$, $ZrO_2$, and $SiO_2$ supports formed small particles which corresponded to the high CO yields in the TPO-$CO_2$ experiments. $SiO_2$ in particular demonstrated the greatest reduction in perovskite particle size, especially in comparison to the abundant alternatives. SEM also emphasized distinction between different oxide morphologies, e.g. orthorhombic perovskite particles and hexagonal $Al_2O_3$ plates. Not only did LSF retain its size, but hexagonal $Al_2O_3$ plates and $TiO_2$ growth appeared to be supported on, if not masking, the perovskite (FIGS. 11E and 11I, respectively). This encapsulation explained the absence of kinetic enhancement when using $Al_2O_3$ and $TiO_2$ as supports with physical barriers hindering $CO_2$ adsorption to the perovskite surface.

The foregoing description of the specific aspects will so fully reveal the general nature of the invention that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

For reasons of completeness, various aspects of the invention are set out in the following numbered clauses:

Clause 1. A catalyst composite comprising: a perovskite-oxide of formula $ABO_3$, wherein A is an alkaline earth element, a rare-earth element, an alkali metal element, a metal element, or a combination thereof, and B is a transitional metal element, metal element, or a combination thereof; and an oxide support having a formula different from the perovskite-oxide.

Clause 2. The catalyst composite of clause 1, wherein the perovskite-oxide has a cubic crystal structure, the O atoms being at the edge centers.

Clause 3. The catalyst composite of any one of clauses 1-2, wherein the oxide support induces strain in the crystal structure.

Clause 4. The catalyst composite of any one of clauses 1-3, wherein the oxide support causes surface reconstruction/termination.

Clause 5. The catalyst composite of any one of clauses 1-4, wherein the oxide support regulates crystallite growth of active surfaces of the perovskite-oxide.

Clause 6. The catalyst composite of any one of clauses 1-5, wherein oxide support increases the perovskite-oxide surface area.

Clause 7. The catalyst composite of any one of clauses 1-6, wherein the perovskite-oxide surface area is between 1 and 1000 $m^2/g$.

Clause 8. The catalyst composite of any one of clauses 1-7, wherein the perovskite-oxide crystallite size is between 5 and 100 nm.

Clause 9. The catalyst composite of any one of clauses 1-8, wherein A is selected from the group consisting of Pb, Ca, Mg, Be, Sr, Ba, La, K, and Na or a combination thereof.

Clause 10. The catalyst composite of any one of clauses 1-9, wherein A has a formula of $A^1_xA^2_y$, wherein $A^1$ and $A^2$ are independently Pb, Ca, Mg, Be, Sr, Ba, La, K, or Na; x is 0-1; y is 0-1; and the sum of x and y is 1.

Clause 11. The catalyst composite of any one of clauses 1-10, wherein A has a formula of $A^1_xA^2_y$, and is $La_{0.75}Sr_{0.25}$.

Clause 12. The catalyst composite of any one of clauses 1-11, wherein B is selected from the group consisting of Fe, Ti, Y, Mn, Al, Cr, Co, Ta, Ni, and Ce, or a combination thereof.

Clause 13. The catalyst composite of any one of clauses 1-12, wherein the perovskite-oxide is $La_{0.75}Sr_{0.25}FeO_3$.

Clause 14. The catalyst composite of any one of clauses 1-13, wherein the oxide support is $CeO_2$, $ZrO_2$, $Al_2O_3$, $SiO_2$, $TiO_2$, or a combination thereof.

Clause 15. The catalyst composite of any one of clauses 1-14, wherein a weight ratio of the perovskite-oxide to the oxide support is from 10:90 to 90:10.

Clause 16. The catalyst composite of any one of clauses 1-15, wherein a weight ratio of the perovskite-oxide to the oxide support is from 25:75 to 75:25.

Clause 17. A method for preparing a catalyst composite, comprising: (a) mixing a perovskite-oxide of formula $ABO_3$ with an oxide support having a formula different from the perovskite-oxide to form a mixture, wherein A is an alkaline earth element, a rare-earth element, an alkali metal element, a metal element, or a combination thereof, B is a transitional metal element, a metal element, or a combination thereof; and (b) heating the mixture to a temperature of between 600° C. and 1300° C.

Clause 17.1 The method of clause 17, wherein the perovskite-oxide of step (a) has a cubic crystal structure, the O atoms being at the edge centers.

Clause 17.2 The method of clause 17 or clause 17.1, wherein the perovskite-oxide adheres to the oxide support in step (b), and wherein the oxide support induces strain in the crystal structure, causes surface reconstruction/termination, and/or regulates crystallite growth of active surfaces of the perovskite-oxide in step (b).

Clause 18. The method of clause 17, wherein the mixing is accomplished by grinding, ball milling, drum tumbling or solution based methods.

Clause 19. The method of any one of clauses 17-18, wherein A is selected from the group consisting of Pb, Ca, Mg, Be, Sr, Ba, La, K, and Na, or a combination thereof.

Clause 20. The method of any one of clauses 17-19, wherein A has a formula of $A^1_xA^2_y$, wherein $A^1$ and $A^2$ are independently Pb, Ca, Mg, Be, Sr, Ba, La, K, or Na; x is 0-1; y is 0-1; and the sum of x and y is 1.

Clause 21. The method of any one of clauses 17-20, wherein B is selected from the group consisting of Fe, Ti, Y, Mn, Al, Cr, Co, Ta, Ni, and Ce, or a combination thereof.

Clause 22. The method of any one of clauses 17-21, wherein the perovskite-oxide is $La_{0.75}Sr_{0.25}FeO_3$.

Clause 23. The method of any one of clauses 17-22, wherein the oxide support is $CeO_2$, $ZrO_2$, $Al_2O_3$, $SiO_2$, $TiO_2$, or a combination thereof.

Clause 24. The method of any one of clauses 17-23, wherein the weight ratio of the perovskite-oxide to the oxide support is from 10:90 to 90:10.

Clause 25. The method of any one of clauses 17-24, wherein the oxide support comprises $M^2$, wherein $M^2$ is an element other than O; and the perovskite-oxide and the oxide support form a secondary phase of formula of $M^1_pM^2_qO_v$, wherein $M^1$ is the A or B component of the perovskite-oxide; p is 1-3; q is 1-3; and v is 2-7.

Clause 26. The method of any one of clauses 17-25, further comprising calcining the perovskite-oxide before step (a).

Clause 27. A method for converting $CO_2$ to CO comprising: (a) contacting $H_2$ with the catalyst composite of claim 1, whereby the perovskite-oxide is reduced, and whereby $H_2$ is oxidized to produce $H_2O$; and (b) contacting $CO_2$ with the catalyst composite, whereby the reduced perovskite-oxide is oxidized, and whereby $CO_2$ is reduced to produce CO.

Clause 28. The method of clause 27, wherein each of step (a) and step (b) is carried out isothermally at a temperature between 450° C. and 800° C.

Clause 29. The method of any one of clauses 27-28, wherein the temperature for steps (a) and (b) is about 600° C.

Clause 30. The method of clause 27, wherein the temperature of step (a) is between 400° C. and 850° C.

Clause 31. The method of any one of clause 27 or 30, wherein the temperature of step (b) is between 450° C. and 900° C.

Clause 32. The method of any one of clauses 27-31, wherein CO is produced at a rate of 0.5 to 1 mmol CO/g perovskite-oxide/min.

Clause 33. The method of any one of clauses 27-32, wherein CO is produced at a rate greater than a process using the perovskite-oxide without the oxide support.

Clause 34. The method of any one of clauses 27-33, further comprising repeating step (a) and step (b) in succession.

Clause 35. The method of any one of clauses 27-34, further comprising wetting of the catalyst composite.

Clause 36. The method of any one of clauses 27-35, further comprising reducing the perovskite-oxide surface area.

We claim:

1. A catalyst composite comprising:
   a perovskite-oxide of formula $ABO_3$, wherein A has a formula of $La_xSr_y$, and B is a transitional metal element, metal element, or a combination thereof; and
   an oxide support having a formula different from the perovskite-oxide;
   wherein x is 0-1, y is 0-1, and the sum of x and y is 1; and
   wherein the perovskite-oxide crystallite size is between 5 and 100 nm.

2. The catalyst composite of claim 1, wherein oxide support increases the perovskite-oxide surface area and wherein the perovskite-oxide surface area is between 1 and 1000 m²/g.

3. The catalyst composite of claim 1, wherein the perovskite-oxide crystallite size is between 30 and 100 nm.

4. The catalyst composite of claim 1, wherein
   x is 0.2-0.8; and
   y is 0.2-0.8.

5. The catalyst composite of claim 1, wherein B is selected from the group consisting of Fe, Ti, Y, Mn, Al, Cr, Co, Ta, Ni, and Ce, or a combination thereof.

6. The catalyst composite of claim 1, wherein the perovskite-oxide is $La_{0.75}Sr_{0.25}FeO_3$.

7. The catalyst composite of claim 1, wherein the oxide support is $CeO_2$, $ZrO_2$, $Al_2O_3$, $SiO_2$, $TiO_2$, or a combination thereof.

8. The catalyst composite of claim 1, wherein a weight ratio of the perovskite-oxide to the oxide support is from 10:90 to 90:10.

9. A method of preparing the catalyst composite of claim 1, comprising:
   (a) mixing the perovskite-oxide of formula $ABO_3$ with the oxide support having a formula different from the perovskite-oxide to form a mixture, wherein B is a transitional metal element, a metal element, or a combination thereof; and
   (b) heating the mixture to a temperature of between 600° C. and 1300° C.

10. The method of claim 9, wherein B is selected from the group consisting of Fe, Ti, Y, Mn, Al, Cr, Co, Ta, Ni, and Ce, or a combination thereof.

11. The method of claim 9, wherein the perovskite-oxide is $La_{0.75}Sr_{0.25}FeO_3$.

12. The method of claim 9, wherein the oxide support is $CeO_2$, $ZrO_2$, $Al_2O_3$, $SiO_2$, $TiO_2$, or a combination thereof.

13. The method of claim 9, wherein the weight ratio of the perovskite-oxide to the oxide support is from 10:90 to 90:10.

14. The method of claim 9, wherein
   the oxide support comprises $M^2$, wherein $M^2$ is an element other than O; and
   the perovskite-oxide and the oxide support form a secondary phase having a formula of $M^1_pM^2_qO_v$, wherein $M^1$ is the A or B component of the perovskite-oxide;
   p is 1-3;
   q is 1-3; and v is 2-7.

15. A method for converting $CO_2$ to CO comprising:
   (a) contacting $H_2$ with the catalyst composite of claim 1, whereby the perovskite oxide is reduced, and whereby $H_2$ is oxidized to produce $H_2O$; and
   (b) contacting $CO_2$ with the catalyst composite, whereby the reduced perovskite oxide is oxidized, and whereby $CO_2$ is reduced to produce CO.

16. The method of claim 15, wherein each of step (a) and step (b) is carried out isothermally at a temperature between 450° C. and 800° C.

17. The method of claim 15, wherein the temperature of step (a) is between 400° C. and 850° C., or wherein the temperature of step (b) is between 450° C. and 900° C.

18. The method of claim 15, wherein CO is produced at a rate of 0.5 to 1 mmol CO/g perovskite-oxide/min.

19. The method of claim 15, further comprising repeating step (a) and step (b) in succession.

\* \* \* \* \*